United States Patent
Tanaka et al.

(10) Patent No.: US 8,010,258 B2
(45) Date of Patent: Aug. 30, 2011

(54) TORQUE CONTROL DEVICE FOR POWER SYSTEM

(75) Inventors: Hiroyuki Tanaka, Susono (JP); Keisuke Kawai, Odawara (JP); Hayato Nakada, Susono (JP); Kaoru Ohtsuka, Mishima (JP); Yuichiro Sawada, Toyota (JP); Shinichi Soejima, Gotemba (JP)

(73) Assignee: Toyota Jidossha Kabushiki Kaisha, Tokyo (JP)

( * ) Notice: Subject to any disclaimer, the term of this patent is extended or adjusted under 35 U.S.C. 154(b) by 460 days.

(21) Appl. No.: 12/309,485

(22) PCT Filed: Sep. 6, 2007

(86) PCT No.: PCT/JP2007/067390
§ 371 (c)(1),
(2), (4) Date: Jan. 21, 2009

(87) PCT Pub. No.: WO2008/029874
PCT Pub. Date: Mar. 13, 2008

(65) Prior Publication Data
US 2010/0004829 A1 Jan. 7, 2010

(30) Foreign Application Priority Data
Sep. 6, 2006 (JP) .................. 2006-241768

(51) Int. Cl.
*G05D 3/12* (2006.01)
(52) U.S. Cl. ........................................ 701/48
(58) Field of Classification Search .............. 701/48, 701/114, 34
See application file for complete search history.

(56) References Cited

U.S. PATENT DOCUMENTS

| 4,282,573 | A |   | 8/1981  | Imai et al. |
|-----------|---|---|---------|-------------|
| 5,212,640 | A | * | 5/1993  | Matsuda ........................ 701/34 |
| 5,886,504 | A | * | 3/1999  | Scott et al. ...................... 322/15 |
| 5,900,722 | A | * | 5/1999  | Scott et al. ...................... 322/46 |
| 5,913,576 | A | * | 6/1999  | Naito et al. ................... 303/112 |
| 6,000,376 | A |   | 12/1999 | Hess et al. |
| 6,018,200 | A | * | 1/2000  | Anderson et al. .......... 290/40 B |
| 6,047,681 | A |   | 4/2000  | Scherer et al. |
| 6,118,186 | A | * | 9/2000  | Scott et al. ................. 290/40 B |
| 6,942,057 | B2 | * | 9/2005 | Boloorchi et al. ........... 180/446 |
| 2004/0000887 | A1 |   | 1/2004 | Lim |

FOREIGN PATENT DOCUMENTS

DE    28 45 354 C2    11/1987

(Continued)

OTHER PUBLICATIONS

Robert Bosch GmbH "Ottomotor-Management", Vieweg Verlag, Wiesbaden, 2005, ISBN: 3-8348-0037-6.

(Continued)

*Primary Examiner* — Paul N Dickson
*Assistant Examiner* — Nicole Verley
(74) *Attorney, Agent, or Firm* — Oliff & Berridge, PLC

(57) ABSTRACT

A torque control device for a power system and facilitates the addition of a new torque control actuator. A target torque signal according to a target torque for the power system is distributed to each actuator in a predetermined distribution priority order. A signal processing filter is mounted on a signal input section of each actuator and allows only a portion of distributed signal that matches the operation characteristics of the actuator to pass through as a command signal for the actuator.

12 Claims, 14 Drawing Sheets

FOREIGN PATENT DOCUMENTS

| | | |
|---|---|---|
| JP | A-05-163996 | 6/1993 |
| JP | A-10-023609 | 1/1998 |
| JP | A-10-309959 | 11/1998 |
| JP | A-11-159364 | 6/1999 |
| JP | A-11-509910 | 8/1999 |
| JP | A-2004-161230 | 6/2004 |
| JP | A-2005-325759 | 11/2005 |
| JP | A-2006-105054 | 4/2006 |
| WO | WO 97/43531 A1 | 11/1997 |

OTHER PUBLICATIONS

German Office Action dated Jan. 20, 2011 in German Patent Application No. 11 2007 002 032.626 (with translation).

* cited by examiner

TORQUE CONTROL DEVICE FOR POWER SYSTEM

TECHNICAL FIELD

The present invention relates to a torque control device for a power system such as an internal combustion engine, and more particularly to a torque control device that provides torque control by having a plurality of actuators cooperate with each other.

BACKGROUND ART

An internal combustion engine is used as a power system for an automobile. The internal combustion engine includes a plurality of actuators such as a throttle, an ignition device, and a fuel injection device, and can achieve desired torque by having these actuators cooperate with each other. Since the torque of the internal combustion engine is determined by the operations of the actuators, it is necessary to determine how to operate the actuators for torque control purposes.

It is conceivable that torque control may be exercised by distributing a target torque to each actuator and operating each actuator in such a manner that the internal combustion engine achieves the distributed target torque. When torque control is to be exercised by using, for instance, the throttle and ignition device, the intended purpose can be accomplished by controlling the throttle opening in accordance with the target torque for the throttle and controlling the ignition timing in accordance with the target torque for the ignition device. A low-pass filter or other signal processing filter can be used to distribute the target torque to each actuator.

A hybrid power system disclosed in Patent Document 1 includes an internal combustion engine and a motor as power units. This system uses a low-pass filter as a means of distributing a target transmission torque to a clutch and motor. More specifically, the low-pass filter eliminates a high-frequency signal component, which cannot be covered by clutch control, from the target transmission torque supplied to a clutch control device. Clutch control is then exercised to achieve the target transmission torque from which the high-frequency signal component is eliminated. In addition, motor control is exercised to implement the high-frequency signal component, which is eliminated by the low-pass filter.
Patent Document 1: JP-A-1999-159364
Patent Document 2: JP-A-1998-23609
Patent Document 3: JP-A-1993-163996

DISCLOSURE OF THE INVENTION

Problem to be Solved by the Invention

In a system having two torque control actuators, installing a low-pass filter in a target torque supply path as is the case with the system described in Patent Document 1 makes it possible to distribute a target torque to each of the two actuators with reference to a cutoff frequency of the low-pass filter.

However, the system configuration described in Patent Document 1 cannot be directly applied to a system to which a torque control actuator may be newly added. The reason is that when an actuator is simply added to the system configuration described in Patent Document 1, there is no means of distributing a target torque to the added actuator. When a torque control actuator is to be newly added to the system configuration described in Patent Document 1, it will be necessary to add a new filter or review the signal pass characteristic of an existing filter. However, the method for such filter addition or review is not described in Patent Document 1.

Increasing the number of torque control actuators is effective in enhancing the accuracy of torque control in a power system. The torque control accuracy of an existing system can be enhanced if a torque control actuator can be added. To assure ease of actuator addition, that is, system expandability, it is important that no control structure change be needed or that required control structure changes be minimal.

The present invention has been made to solve the above problem. An object of the present invention is to provide a power system torque control device that facilitates the addition of a new torque control actuator.

Means for Solving the Problem

First aspect of the present invention is a torque control device for a power system, the torque control device for a power system comprising:

a plurality of actuators which operate in accordance with input command signals and cause the power system to achieve torque according to the operation;

a signal distribution structure which distribute a target torque signal according to the power system's target torque to the actuators in a predetermined distribution priority order; and a signal processing filter which is mounted on a signal input section of each actuator and allows only a portion of signal supplied from the signal distribution structure that matches the operation characteristics of the actuator to pass through as a command signal for the actuator.

Second aspect of the present invention is the torque control device for a power system according to the first aspect, wherein the distribution priority order is set in order of increasing torque response sensitivity to an actuator operation.

Third aspect of the present invention is the torque control device for a power system according to the first or the second aspect, wherein the signal distribution structure is formed so that a signal obtained by subtracting a signal that has passed through the signal processing filter from a signal that has not passed through is supplied to the next-order actuator.

Firth aspect of the present invention is the torque control device for a power system according to the first or the second aspect, wherein the signal distribution structure is formed to include a second signal processing filter, which allows the passage of only a signal matching a particular signal region within a signal region where the actuator is operative, supply a signal that has passed through the second signal processing filter to the actuator, and supplies a signal obtained by subtracting a signal that has passed through the second signal processing filter from a signal that has not passed through to the next-order actuator.

Fifth aspect of the present invention is the torque control device for a power system according to the fourth aspect, further comprising:

signal pass characteristic correction means for correcting the signal pass characteristic of the second signal processing filter in accordance with a signal obtained by subtracting a signal that has passed through the second signal processing filter and the signal processing filter and a signal to be supplied to the next-order actuator from a signal that has not passed through the second signal processing filter.

Sixth aspect of the present invention is the torque control device for a power system according to the fourth aspect, further comprising:

filter selection means for selecting an appropriate filter from a plurality of filters in accordance with the operating status of the power system, the plurality of filters which differ in signal pass characteristic being served as the second signal processing filter.

Seventh aspect of the present invention is the torque control device for a power system according to the sixth aspect, wherein the filter selection means selects the filter to be used as the second signal processing filter in accordance with the quality of predicted torque response sensitivity prevailing when the actuator operates in compliance with a command signal.

Eighth aspect of the present invention is the torque control device for a power system according to the third aspect, wherein the maximum pass frequency of the signal processing filter is set to be lower than the highest possible response frequency achievable by the associated actuator.

Ninth aspect of the present invention is the torque control device for a power system according to the third aspect, further comprising:
feedback means which, if there is a difference between a signal that has not passed through the signal processing filter for the lowest-order actuator and a signal that has passed through, ensures that a difference signal representing the difference is reflected in the generation of a target torque signal.

Tenth aspect of the present invention is the torque control device for a power system according to the third aspect, further comprising:
prediction means for predicting changes in the power system's target torque; and
combination determination means for determining the combination of a plurality of signal processing filters for the plurality of actuators in accordance with the predicted target torque changes, the plurality of signal processing filters being differ in signal pass characteristic and being provided respectively for the plurality of actuators.

Eleventh aspect of the present invention is the torque control device for a power system according to the third aspect, further comprising:
feedback means which, if there is a difference between a signal that has not passed through a saturation element and a signal that has passed through, ensures that a difference signal representing the difference is reflected in the generation of a target torque signal, the saturation element limiting the maximum and minimum values of a command signal and being included in the signal processing filter.

Twelfth aspect of the present invention is the torque control device for a power system according to the eleventh aspect, further comprising:
abnormality judgment means which, if the difference does not disappear within a predetermined period of time after the difference signal is reflected in the generation of a target torque signal, judges that the generation of a target torque signal is abnormal.

Thirteenth aspect of the present invention is the torque control device for a power system according to the third aspect, further comprising:
abnormality judgment means which, if a signal that has not passed through a saturation element remains different from a signal that has passed through for a predetermined period of time, judges that the actuator is abnormal, the saturation element limiting the maximum and minimum values of a command signal in accordance with a torque change range achieved by the operation of an actuator and being included in the signal processing filter.

Fourteenth aspect of the present invention is the torque control device for a power system according to the third aspect, further comprising:
feedback means which, if there is a difference between an operation target value and an actual value of the actuator, ensures that a difference signal representing the difference is reflected in signal pass characteristic setup for each signal processing filter installed upstream of the actuator.

Fifteenth aspect of the present invention is the torque control device for a power system according to the third aspect, further comprising:
feedback means which, if there is a difference between the torque equivalent of a command signal input to the actuator and the torque achieved by an operation of the actuator, ensures that a difference signal representing the difference is reflected in signal pass characteristic setup for each signal processing filter installed upstream of the actuator.

Sixteenth aspect of the present invention is the torque control device for a power system according to any one of the first to the fifteenth aspects, further comprising:
a plurality of control groups which each include the plurality of actuators, the signal processing filter, and the signal distribution structure; and
group selection means for selecting the control group to be used for torque control over the power system from the plurality of control groups.

Seventeenth aspect of the present invention is the torque control device for a power system according to the sixteenth aspect, wherein the group selection means selects the control group to be used for torque control over the power system in accordance with the power system's target torque.

Eighteenth aspect of the present invention is the torque control device for a power system according to the sixteenth aspect, herein the group selection means selects the control group to be used for torque control over the power system in accordance with the status of each actuator.

Nineteenth aspect of the present invention is the torque control device for a power system according to any one of the first to the fifteenth aspects, further comprising:
a preferred actuator for which the command signal is determined prior to the command signals for the other actuators; and
target torque signal correction means which subtracts the command signal input to the preferred actuator from a target torque signal distributed by the signal distribution structure to the plurality of actuators.

Twentieth aspect of the present invention is the torque control device for a power system according to any one of the first to the nineteenth aspects, wherein the power system is an internal combustion engine mounted in an automobile.

Twenty-first aspect of the present invention is the torque control device for a power system according to the twentieth aspect, wherein the actuators include a throttle for adjusting the intake air amount and an ignition device for adjusting the ignition timing.

Twenty-second aspect of the present invention is the torque control device for a power system according to the twentieth aspect, wherein the actuators include a variable lift mechanism for changing the lift amount of an intake valve and an ignition device for adjusting the ignition timing.

Twenty-third aspect of the present invention is the torque control device for a power system according to the twenty-first or twenty-second aspect, wherein the actuators further include a fuel injection device for adjusting the fuel injection timing and the fuel injection amount.

Twenty-fourth aspect of the present invention is the torque control device for a power system according to the twenty-first to the twenty-third aspects, wherein the actuators further include an accessory that is driven by the internal combustion engine.

Twenty-fifth aspect of the present invention is the torque control device for a power system according to the first to the nineteenth aspects, wherein the power system is a hybrid power system composed of an internal combustion engine and a motor; and wherein the actuators include the motor.

Twenty-sixth aspect of the present invention is the torque control device for a power system according to the twentieth to the twenty-fifth aspects, further comprising:

a particular signal elimination filter which eliminates a signal component within a particular frequency region from the target torque signal to be supplied to the signal distribution structure.

Twenty-seventh aspect of the present invention is the torque control device for a power system according to the twenty-sixth aspect, wherein the particular signal elimination filter eliminates a signal component having the same frequency as a vehicle's natural frequency from the target torque signal.

Twenty-eighth aspect of the present invention is the torque control device for a power system according to the twentieth to the twenty-fifth aspects, further comprising:

signal pass characteristic change means which changes the signal pass characteristic of the signal processing filter in accordance with the rotation speed of the internal combustion engine.

Twenty-ninth aspect of the present invention is the torque control device for a power system according to the twentieth to the twenty-fifth aspects, the power system including a transmission that shifts gears and transmits the rotary motion of the internal combustion engine to driving wheels, the torque control device further comprising:

torque change range prediction means which predicts the range of torque changes that can be brought about by operating each of the actuators at the current engine rotation speed;

target torque change range prediction means which predicts the range of target torque changes under the current operating conditions; and transmission gear ratio control means which, when an achievable torque change range is insufficient as compared to a target torque change range, adjusts the gear ratio of the transmission to change the engine rotation speed in the direction of enlarging the torque change range.

Advantages of the Invention

According to the first aspect of the present invention, the target torque signal is distributed to each actuator. Therefore, a plurality of actuators do not redundantly operate to achieve the target torque. Further, each actuator is provided with a signal processing filter that allows only a signal matching the actuator's operation characteristics to pass through. Therefore, a command signal exceeding the actuator's operating capacity will not enter the actuator. When a new actuator is to be added, it should be incorporated into the signal distribution structure together with a signal processing filter that allows only a signal matching the actuator's operation characteristics to pass through. In such an instance, there is no need to review the signal pass characteristic of an existing signal processing filter. Further, no control structure changes are required for actuator addition. Even if control structure changes are unavoidable, it can be minimized.

According to the second aspect of the present invention, the target torque signal is preferentially distributed to an actuator having relatively low torque response sensitivity to an operation. This makes it possible to avoid imposing an undue torque control burden on one actuator and effectively use every actuator, from an actuator having low response sensitivity to an actuator having high response sensitivity.

According to the third aspect of the present invention, an existing control structure need not be changed when a new actuator is to be added. Further, the order of priority for target torque signal distribution to a newly added actuator can be determined in accordance with the position of the signal processing filter to be added to the signal distribution structure. Furthermore, the distribution priority order of each actuator can be changed with ease simply by changing the position of each signal processing filter in the signal distribution structure.

When signal regions where a plurality of actuators are operative overlap with each other, the fourth aspect of the present invention makes it possible to arbitrarily select the actuator to be operated in such an overlap signal region. More specifically, the signal pass characteristic of the second signal processing filter for actuators to be inoperative in the overlap signal region is set so that a signal matching the overlap signal region does not pass, that is, the overlap signal region is not included in the particular signal region. Further, the actuator operative in the overlap signal region can be changed to another actuator by changing the particular signal region setting for each second signal processing filter.

The signal obtained by subtracting a signal that has passed through the second signal processing filter and the signal processing filter and the signal to be supplied to the next-order actuator from a signal that has not passed through the second signal processing filter is an error signal that does not invoke an operation in the current actuator or the next-order actuator. The fifth aspect of the present invention can correct the signal pass characteristic of the second signal processing filter in accordance with the error signal to eliminate a signal region that is unimplementable in any actuator.

When signal regions where a plurality of actuators are operative overlap with each other, the sixth aspect of the present invention can change an actuator operative in such an overlap signal region in accordance with the operating status of the power system, and provide optimum torque control suitable for the operating status of the power system.

When the filter to be used as the second signal processing filter is to be determined in accordance with the operating status of the power system, the seventh aspect of the present invention makes it possible to consider the appropriateness of torque response sensitivity that may be exhibited when an actuator is operated, and select the optimum actuator that provides highly accurate torque control.

In reality, the maximum response frequency of an actuator may be lower than a design value due to unit-to-unit variation or aging. Under such circumstances, the eighth aspect of the present invention ensures that a signal passing through the signal processing filter does not exceed the actuator's maximum response frequency.

The difference signal representing the difference between a signal that has not passed through the signal processing filter for the lowest-order actuator and a signal that has passed through indicates a signal region of a target torque signal that cannot be handled by any actuator. The ninth aspect of the present invention can reflect the difference signal in target torque signal generation. This makes it possible to generate a target torque signal within an implement able signal region and enhance the accuracy of target torque achievement.

The tenth aspect of the present invention makes it possible to predict a target torque change and change the target torque signal distribution to each actuator in accordance with the predicted target torque change. Therefore, the operation of each actuator can be optimized to enhance the accuracy of target torque achievement.

The difference signal representing the difference between a signal that has not passed through the saturation element and a signal that has passed through indicates a torque that cannot be achieved by the associated actuator. The eleventh aspect of the present invention can reflect the difference signal in target torque signal generation. This makes it possible to limit a target torque signal within an achievable range and enhance the accuracy of target torque achievement.

According to the twelfth aspect of the present invention, the difference signal representing the difference between a signal that has not passed through the saturation element and a signal that has passed through can be used to diagnose whether a target torque signal is generated normally.

According to the thirteenth aspect of the present invention, the maximum and minimum values of the saturation element are limited in accordance with the range of torque change caused by the operation of an actuator. Therefore, if there is a difference between a signal that has not passed through the saturation element and a signal that has passed through, it means that the actuator has not accomplished a desired operation. Consequently, the normality of an actuator operation can be diagnosed by checking for the difference between a signal that has not passed through the saturation element and a signal that has passed through.

When a command signal exceeding the operating capacity of an actuator enters the actuator, there arises a difference between the actuator's operating target value and actual value. According to the fourteenth aspect of the present invention, when the difference signal representing the difference is reflected in signal pass characteristic setup for each signal processing filter installed upstream of the actuator, target torque distribution can be achieved so that the command signal entering the actuator is within its capacity. This makes it possible to enhance the accuracy of target torque achievement.

When a command signal exceeding the operating capacity of an actuator enters the actuator, there arises a difference between the torque equivalent of the command signal entering the actuator and the torque achieved by the operation of the actuator. According to the fifteenth aspect of the present invention, when the difference signal representing the difference is reflected in signal pass characteristic setup for each signal processing filter installed upstream of the actuator, target torque distribution can be achieved so that the command signal entering the actuator is within its capacity. This makes it possible to enhance the accuracy of target torque achievement.

According to the sixteenth aspect of the present invention, the control group to be used for torque control over the power system can be selected from a plurality of control groups. This makes it possible to provide torque control over a wide dynamic range. Further, this offers the advantage of increasing the degree of freedom in system design.

According to the seventeenth aspect of the present invention, the accuracy of target torque achievement can be enhanced by changing the control group in accordance with a target torque.

According to the eighteenth aspect of the present invention, the influence of the states of individual actuators upon torque control can be reduced by changing the control group in accordance with the state of each actuator.

When there is a request for operating a particular actuator prior to the other actuators, the nineteenth aspect of the present invention can fulfill the request while achieving a target torque by operating all actuators including the particular actuator (preferred actuator).

According to the twentieth aspect of the present invention, a new torque control actuator can easily be added to a torque control scheme for an internal combustion engine mounted in an automobile.

According to the twenty-first aspect of the present invention, torque control can be exercised while a target torque is allotted as the torque to be achieved by controlling the throttle opening and the torque to be achieved by controlling the ignition timing.

According to the twenty-second aspect of the present invention, torque control can be exercised while a target torque is allotted as the torque to be achieved by controlling the lift amount of an intake valve and the torque to be achieved by controlling the ignition timing.

According to the twenty-third aspect of the present invention, torque control can be exercised while a target torque is additionally allotted as the torque to be achieved by controlling the fuel injection timing and amount.

According to the twenty-fourth aspect of the present invention, torque control can be exercised while a target torque is additionally allotted as the torque to be achieved by allowing accessories to exercise load control.

According to the twenty-fifth aspect of the present invention, a new torque control actuator can easily be added to a hybrid power system composed of an internal combustion engine and a motor.

According to the twenty-sixth aspect of the present invention, it is possible to prevent an internal combustion engine from allowing particular frequencies to oscillate by eliminating the signal components of the particular frequencies from the target torque signal.

According to the twenty-seventh aspect of the present invention, vehicle vibration can be suppressed by eliminating a signal component having the same frequency as the vehicle's natural frequency from the target torque signal.

In an internal combustion engine, the signal region for a target torque signal implementable by each actuator depends on the engine rotation speed. According to the twenty-eighth aspect of the present invention, target torque signal distribution can be accomplished in accordance with the operating capacity of each actuator by changing the signal pass characteristic of a signal processing filter in accordance with the engine rotation speed. This makes it possible to enhance the accuracy of target torque achievement.

In an internal combustion engine, the torque response sensitivity to the operation of an actuator depends on the engine rotation speed. According to the twenty-ninth aspect of the present invention, the actuator can operate so as to let the range of torque change brought about by the actuator cover a target torque change range by controlling the gear ratio of a transmission to change the engine rotation speed. This makes it possible to achieve a target torque with high accuracy.

Figure 1:
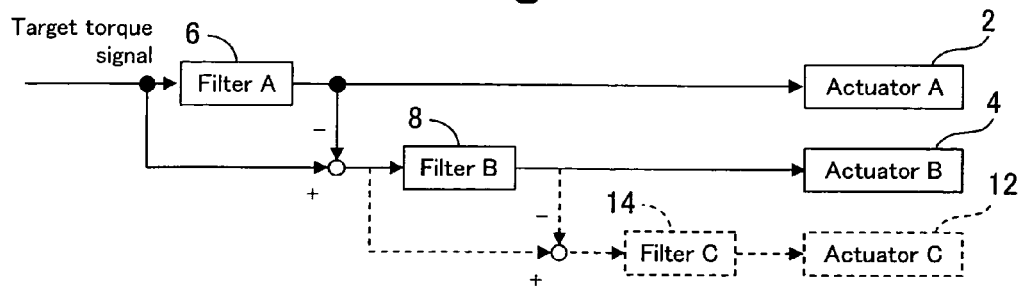
FIG. 1 is a control block diagram illustrating the torque control device according to a first embodiment of the present invention.

DESCRIPTION OF REFERENCE NUMERALS 2, 4, 12, 50, 80: actuator
6, 8, 14, 52: filter
18, 40, 54: mediation filter
18a: normal filter
18b: emission filter
18c: combustion improvement filter
22: signal pass characteristic judgment section
30: torque conversion section
36, 74: target torque signal generation section
38: filter evaluation section
44, 58: control group selection section
60, 96: low-pass filter
62, 64, 84: saturation element
72, 88: abnormality diagnosis section
82, 92, 100: operation target value setup section
94, 102: actuator control section
110, 112: torque estimation section
120: vibration suppression filter
126: passband change section
130: engine control section
132: transmission control section
134, 136: torque change range prediction section
140: torque change range insufficiency judgment section

BEST MODE FOR CARRYING OUT THE INVENTION

Embodiments of the present invention will now be described on the assumption that a torque control device according to the present invention is applied to a car-mounted internal combustion engine (hereinafter abbreviated to the engine), or more specifically, a spark ignition engine.

First Embodiment

FIG. 1 is a control block diagram illustrating the torque control device according to a first embodiment of the present invention. The engine includes a plurality of actuators 2, 4, 12 related to its torque control. These actuators 2, 4, 12 operate in accordance with input command signals, thereby causing the engine to achieve torque according to the operations of the actuators 2, 4, 12. Here, it is assumed that actuator A 2 is a throttle, and that actuator B 4 is an ignition device, and further that actuator C 12 is a fuel injection device. The throttle can control the torque of the engine by changing its opening. The ignition device can control the torque of the engine by changing its ignition timing. The fuel injection device can control the torque of the engine by changing the fuel injection amount and timing.

The torque control device according to the present embodiment is characterized in that an actuator for use in torque control can be added with ease. First of all, a method of exercising torque control by using actuators A 2 and B 4 will be described. Next, a method of adding actuator C 12 as an actuator for use in torque control will be described.

Various torque requests are sent to an engine control device (this control device is at a higher level than the torque control device). The torque requests include not only a request from the driver but also requests from various devices such as a VSC, TRC, and transmission. The engine control device compiles the various torque requests into an engine target torque, converts the engine target torque into a digital target torque signal, and supplies the obtained target torque signal to the torque control device.

The torque control device distributes the target torque signal to two actuators 2, 4 as a command signal. Filters 6, 8 are used to distribute the target torque signal. The filters 6, 8 are mounted on signal input sections of the actuators 2, 4. These filters 6, 8 allow only a signal matching the operation characteristics of the associated actuators 2, 4 to pass through as the command signal. Filter A 6, which is used with actuator A 2, includes a filter (low-pass filter, band-pass filter, or other filter in a narrow sense), which allows the passage of signals having frequencies at which actuator A 2 is operative or to be operated, and a guard (saturation element), which limits signals to amplitudes at which actuator A 2 is operative or to be operated. Similarly, filter B 8, which is used with actuator B 4, includes a filter, which allows the passage of signals having frequencies at which actuator B 4 is operative or to be operated, and a guard, which limits signals to amplitudes at which actuator B 4 is operative or to be operated. These filters 6, 8 correspond to the "signal processing filter" according to the first aspect of the present invention.

As regards a signal distribution structure for the torque control device, the order of priority for target torque signal distribution to the actuators 2, 4 is predefined. The distribution priority order can be set as desired. For the configuration shown in FIG. 1, however, the distribution priority order is set in order of increasing torque response sensitivity to an actuator operation. More specifically, the distribution priority order is set so that the throttle (actuator A) 2, which has low torque response sensitivity, precedes the ignition device (actuator B) 4, which has high torque response sensitivity. Setting the distribution priority order as described above makes it possible to avoid imposing an undue torque control burden on one actuator and effectively use every actuator, from an actuator having low response sensitivity to an actuator having high response sensitivity. To be more precise, the distribution priority order for the actuators 2, 4 is determined by the positions of the associated filters 6, 8 in the signal distribution structure.

In the configuration shown in FIG. 1, the target torque signal directly enters filter A 6, which correlates to high-level actuator A 2. A signal passing through filter A 6 enters actuator A 2 as a command signal. A difference signal, which is obtained by subtracting a signal that has passed through high-level filter A 6 from a signal that has not passed through, enters filter B 8, which correlates to low-level actuator B 4. The difference signal is a portion of target torque signal that cannot or will not be implemented by actuator A 2. The difference signal enters filter B 8. The signal that has passed through filter B 8 enters actuator B 4 as a command signal. This ensures that actuator A 2 achieves the entire portion of target torque that can be achieved by actuator A 2, and that actuator B 4 achieves only the portion of target torque that cannot be achieved by actuator A 2.

In some cases, it may be requested that actuator B 4 be preferentially used for torque control. In such an instance, the intended purpose is accomplished simply by exchanging the positions of filter A 6 and filter B 8. In such an instance, too, actuator A 2 is naturally connected to filter A 6 with actuator B 4 connected to filter B 8. Exchanging the positions of the filters 6, 8 in the signal distribution structure as described above ensures that actuator B 4 achieves the entire portion of target torque that can be achieved by actuator B 4, and that actuator A 2 achieves only the portion of target torque that cannot be achieved by actuator B 4.

When actuator C 12 is to be added, filter C 14, which allows only a signal matching the operation characteristics of actuator C 12 to pass through, is mounted on the signal input section. Further, filter C 14 is incorporated into the signal distribution structure. More specifically, a difference signal obtained by subtracting a signal that has passed through filter B 8 from a signal that has not passed through should enter filter C 14 as indicated by broken lines in FIG. 1. This difference signal is a portion of target torque signal that cannot or will not be implemented by actuator A 2 or actuator B 4. The difference signal enters filter C 14. The signal that has passed through filter C 14 enters actuator C 12 as a command signal. This ensures that actuator A 2 achieves the entire portion of target torque that can be achieved by actuator A 2, and that actuator B 4 achieves the entire portion of target torque that cannot be achieved by actuator A 2 but can be achieved by actuator B 4, and further that C 12 achieves only the portion of target torque that can be achieved neither by actuator A 2 nor by actuator B 4.

When actuator C 12 is added as described above, the distribution priority order is such that actuator C 12 has the lowest priority. As described earlier, however, the distribution priority order for the actuators 2, 4, 12 can be freely changed by changing the positions of the associated filters 6, 8, 14. When, for instance, filter C 14 is positioned between filter A 6 and filter B 8, the distribution priority order is set so that actuator A 2 precedes actuator C 12.

As described above, the torque control device according to the present embodiment is configured so that when actuator C 12 is to be newly added, the existing control structure need not be changed. More specifically, there is no need to add a new filter to the existing actuators 2, 4 or review the signal pass characteristics of the existing filters 6, 8. Further, the order of priority for target torque signal distribution to actuator C 12, which is to be newly added, can be determined in accordance with the position of filter C 14, which is to be added to the signal distribution structure. Furthermore, the distribution priority order for the actuators 2, 4, 12 can be changed with ease simply by changing the positions of the filters 6, 8, 14 in the signal distribution structure.

Second Embodiment

Figure 2:
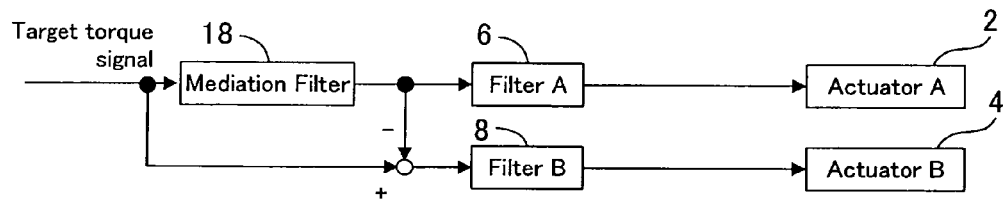
FIG. 2 is a control block diagram illustrating the torque control device according to a second embodiment of the present invention.

FIG. 2 is a control block diagram illustrating the torque control device according to a second embodiment of the present invention. The engine includes a plurality of actuators 2, 4 related to its torque control. These actuators 2, 4 operate in accordance with input command signals, thereby causing the engine to achieve torque according to the operations of the actuators 2, 4.

The torque control device according to the present embodiment is characterized in that when signal regions where a plurality of actuators are operative overlap with each other, the actuator to be operated in such an overlap signal region can be arbitrarily selected. A torque control method according to the present embodiment will now be described.

Various torque requests are sent to an engine control device (this control device is at a higher level than the torque control device). The torque requests include not only a request from the driver but also requests from various devices such as a VSC, TRC, and transmission. The engine control device compiles the various torque requests into an engine target torque, converts the engine target torque into a digital target torque signal, and supplies the obtained target torque signal to the torque control device.

The torque control device distributes the target torque signal to two actuators 2, 4 as a command signal. Filters 6, 8 are mounted on signal input sections of the actuators 2, 4. These filters 6, 8 allow only a signal matching the operation characteristics of the actuators 2, 4 to pass through as the command signal. Filter A 6, which is used with actuator A 2, includes a filter (low-pass filter, band-pass filter, or other filter in a narrow sense), which allows the passage of signals having frequencies at which actuator A 2 is operative or to be operated, and a guard (saturation element), which limits signals to amplitudes at which actuator A 2 is operative or to be operated. Similarly, filter B 8, which is used with actuator B 4, includes a filter, which allows the passage of signals having frequencies at which actuator B 4 is operative or to be operated, and a guard, which limits signals to amplitudes at which actuator B 4 is operative or to be operated. These filters 6, 8 correspond to the "signal processing filter" according to the first aspect of the present invention.

A mediation filter 18 is used to distribute the target torque signal to the actuators 2, 4. The mediation filter 18 is positioned upstream of filter A 6. The target torque signal that has passed through the mediation filter 18 enters filter A 6, which correlates to high-level actuator A 2. A signal that has passed through filter A 6 enters actuator A 2 as a command signal. A difference signal, which is obtained by subtracting a signal that has passed through the mediation filter 18 from a signal that has not passed through, enters filter B 8, which correlates to low-level actuator B 4. The difference signal enters filter B 8. The signal that has passed through filter B 8 enters actuator B 4 as a command signal.

Figure 3:
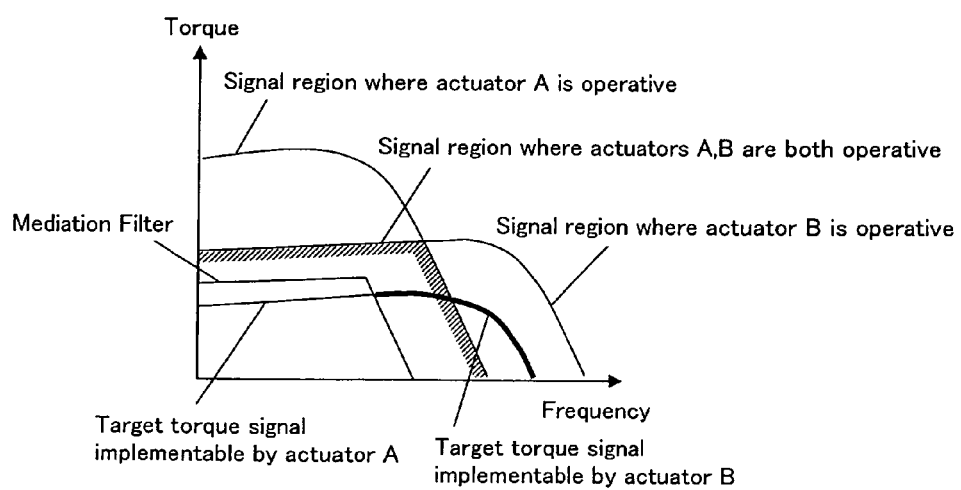
FIG. 3 shows the operation of the torque control device according to the second embodiment of the present invention.

The mediation filter 18 allows the passage of only a signal matching a particular signal region, which is included in a signal region where actuator A 2 is operative. FIG. 3 shows the relationship between a signal region where actuator A 2 is operative, a signal region where actuator B 4 is operative, and a passband (particular signal region) of the mediation filter 18. In FIG. 3, the signal region where actuator A 2 is operative corresponds to the passband of filter A 6. The signal region where actuator B 4 is operative corresponds to the passband of filter B 8. In the present embodiment, the passband of the mediation filter 18 is set within a signal region (overlap signal region) where the actuators 2, 4 are both operative. The mediation filter 18 corresponds to the "second signal processing filter" according to the fourth aspect of the present invention.

When a target torque signal indicated by a curve in FIG. 3 is entered in the configuration shown in FIG. 2, only a thin-line portion of the target torque signal passes through the mediation filter 18. The signal that has passed through the mediation filter 18 passes through filter A 6 and enters actuator A 2. If the signal is within a signal region where actuator A 2 is operative, but is outside the passband of the mediation filter 18, it enters actuator B 4 instead of actuator A 2. A thick-line portion of the curve representing the target torque signal enters actuator B 4. This ensures that a part of the target torque signal implementable by actuator A 2, which has a high distribution priority, can be implemented by actuator B 4, which has a low distribution priority.

The torque control device according to the present embodiment is configured so that when signal regions where two actuators 2, 4 are operative overlap with each other, the actuator to be operated in such an overlap signal region can be arbitrarily selected. More specifically, the passband of the mediation filter 18 should be set in accordance with the signal region to be implemented by actuator A 2, which has a high distribution priority. This ensures that an overlap signal region other than the passband of the mediation filter 18 can be implemented by actuator B 4, which has a low distribution priority.

Further, the torque control device according to the present embodiment is configured so that the signal regions to be implemented by the actuators 2, 4 can be changed by changing the setting for the passband of the mediation filter 18. When actuator A 2 is the throttle while actuator B 4 is the ignition device, a signal region for exercising engine torque control by changing the throttle opening and a signal region for exercising engine torque control by changing the ignition timing can be mediated with ease by changing the setting for the passband of the mediation filter 18 in accordance, for instance, with an engine operation mode and restrictions.

It should be noted that a new actuator can also be added to the torque control device according to the present embodiment. In such an instance, a filter (signal processing filter) for allowing the passage of only a signal matching the operation characteristics of the new actuator and a mediation filter (second signal processing filter) for mediating a signal region where actuator B 4 exercises torque control and a signal region where the new actuator exercises torque control should be added to the configuration shown in FIG. 2.

Third Embodiment

Figure 4:
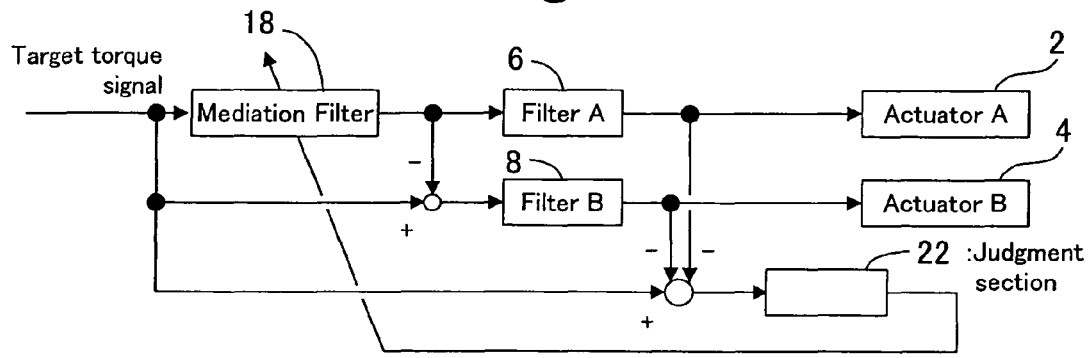
FIG. 4 is a control block diagram illustrating the torque control device according to a third embodiment of the present invention.

FIG. 4 is a control block diagram illustrating the torque control device according to a third embodiment of the present invention. The torque control device according to the present embodiment is configured so that a new function is added to the torque control device according to the second embodiment. Elements that are included in the configuration shown in FIG. 4 and identical with those of the second embodiment are assigned the same reference numerals as their counterparts.

The torque control device according to the present embodiment is configured so as to correct the signal pass characteristic of the mediation filter 18. The advantage and method of correcting the signal pass characteristic of the mediation filter 18 will now be described with reference to FIGS. 5 and 6.

Figure 5:
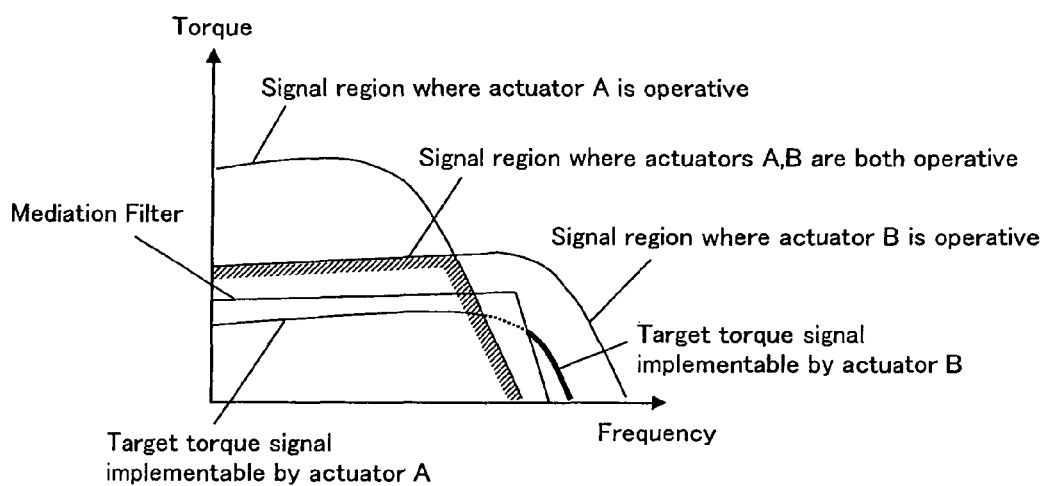
FIG. 5 shows the operation of the torque control device according to the third embodiment of the present invention.

FIG. 5 shows the relationship between a signal region where actuator A 2 is operative, a signal region where actuator B 4 is operative, and an uncorrected passband of the mediation filer 18. Here, it is assumed that the signal region where actuator A 2 is operative, that is, the passband of filter A 6, is significantly exceeded by the passband of the mediation filter 18. When a target torque signal indicated by a curve in FIG. 5 is entered, a thin-line portion and a dotted-line portion of the curve representing the target torque signal pass through the mediation filter 18. The thin-line portion of the signal passes through filter A 6, whereas the dotted-line portion of the signal is eliminated by filter A 6. Meanwhile, the signal passing through filter B 8 is a signal outside the passband of the mediation filter 18, that is, a thick-line portion of the curve representing the target torque signal. As a result, the dotted-line portion of the signal is implemented neither by actuator A 2 nor by actuator B 4.

The signal pass characteristic of the mediation filter 18 is corrected to eliminate the aforementioned signal region that can be implemented neither by actuator A 2 nor by actuator B 4. More specifically, the signal obtained by subtracting a signal that has passed through the filters 6, 8 from the target torque signal enters a judgment section 22, which is newly added. This signal is an error signal that does not permit high-level actuator A 2 or low-level actuator B 4 to operate. The judgment section 22 judges whether the error signal is within a predicted tolerance range. If the obtained judgment result indicates that the error signal is outside the tolerance range, it is reflected in the passband setting for the mediation filter 18. The judgment section 22 corresponds to the "signal pass characteristic correction means" according to the fifth aspect of the present invention.

Figure 6:
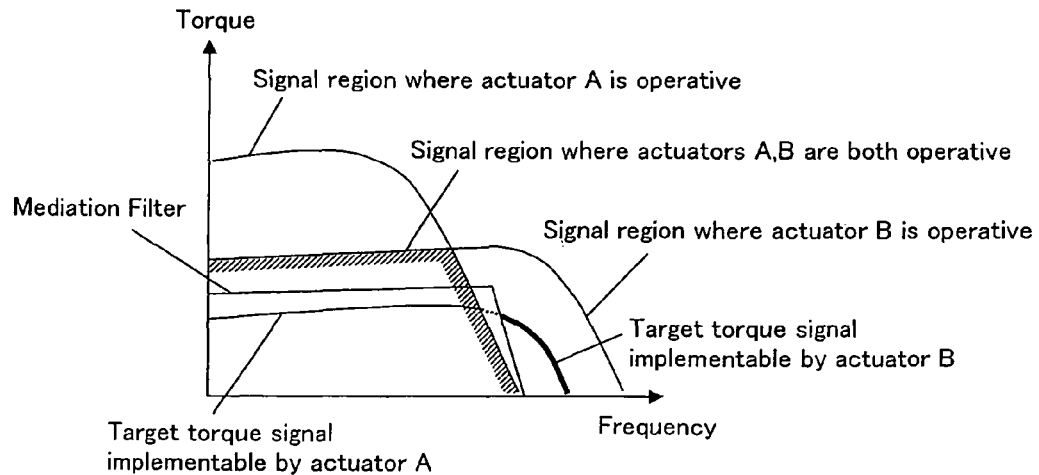
FIG. 6 shows the operation of the torque control device according to the third embodiment of the present invention.

FIG. 6 shows the relationship between a signal region where actuator A 2 is operative, a signal region where actuator B 4 is operative, and a corrected passband of the mediation filer 18. When the aforementioned judgment result is reflected in the passband setting for the mediation filter 18, the passband of the mediation filter 18 is corrected so as to reduce a portion that is outside the passband of filter A 6. Consequently, a dotted-line portion of the curve representing the target torque signal, that is, a signal region that can be implemented neither by actuator A 2 nor by actuator B 4, can be reduced as is obvious from the comparison between FIGS. 5 and 6. Signals distributed from the mediation filter 18 whose passband is corrected enter the actuators 2, 4.

The torque control device according to the present embodiment is configured so that when the signal pass characteristic of the mediation filter 18 is improperly set, it can be corrected before operating the actuators 2, 4. As a result, a signal region that can be implemented neither by actuator A 2 nor by actuator B 4 can be reduced to enhance the accuracy of target torque achievement.

Fourth Embodiment

Figure 7:
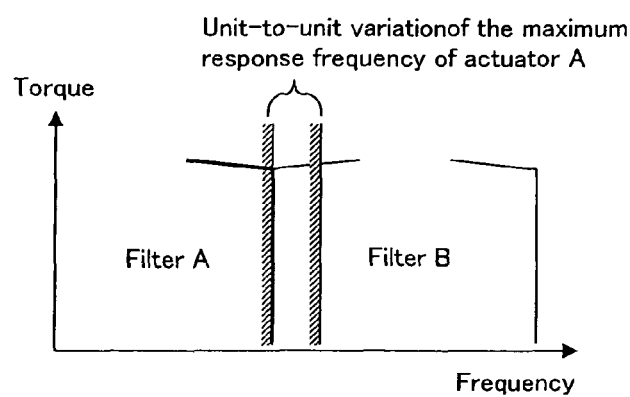
FIG. 7 illustrates the setting of the signal pass characteristics of the filters according to a fourth embodiment of the present invention.

The torque control device according to a fourth embodiment of the present invention is based on the configuration of the first embodiment and characterized in that the signal pass characteristics of the filters (signal processing filters) are set as described below. FIG. 7 illustrates how the signal pass characteristics of the filters according to the fourth embodiment are set.

In the configuration shown in FIG. 1, the passbands of the filters are set in accordance with signal regions where the associated actuators are operative or to be operated. However, the actuators are subject to unit-to-unit variation and aging. Therefore, the passbands of the filters may become wider than the signal regions where the actuators are operative. In such a situation, some signals cannot be implemented by the actuators although they pass through the filters.

In view of the above circumstances, the torque control device according to the present embodiment considers the unit-to-unit variation and aging of each actuator, or more particularly, the unit-to-unit variation and temporal change of the maximum response frequency, and sets the filter's maximum pass frequency to the lowest possible maximum response frequency. When the signal pass characteristics are set as shown in FIG. 7, the maximum pass frequency of filter A is set to the lowest possible maximum response frequency of actuator A. Further, the minimum pass frequency of filter B is set to the maximum pass frequency of filter A.

The setup shown in FIG. 7 makes it possible to prevent signals passing through filter A from exceeding the maximum response frequency of actuator A. Therefore, every signal that has passed through filter A can be implemented by actuator A. Further, signals that can be implemented by actuator A but is eliminated by filter A can be implemented by actuator B, which has a higher response speed than actuator A. This ensures that every signal can be implemented by a certain actuator. Consequently, the accuracy of target torque achievement can be enhanced.

Fifth Embodiment

Figure 8:
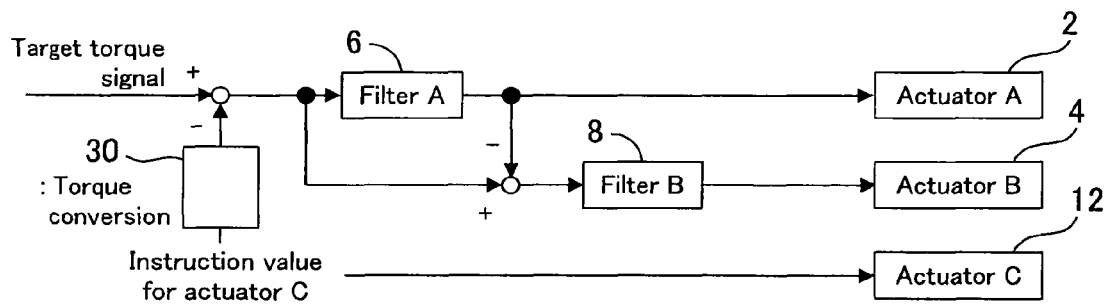
FIG. 8 is a control block diagram illustrating the torque control device according to a fifth embodiment of the present invention.

FIG. 8 is a control block diagram illustrating the torque control device according to a fifth embodiment of the present invention. The torque control device according to the present embodiment is configured so that a new function is added to the torque control device according to the first embodiment. Elements that are included in the configuration shown in FIG. 8 and identical with those of the first embodiment are assigned the same reference numerals as their counterparts.

As is the case with the first embodiment, the present embodiment assumes that actuator A 2 is a throttle, and that actuator B 4 is an ignition device, and further that actuator C 12 is a fuel injection device. When emphasis is placed on torque responsiveness, the order of priority for target torque distribution, from highest to lowest, is the throttle, the ignition device, the fuel injection device. However, it is demanded that the engine perform not only a torque response function but also various other functions such as catalyst warm-up, knock avoidance, and engine protection. When a certain function is to be exercised, it may be necessary to ensure that the operation of a particular actuator always precedes the operation of another actuator.

The torque control device according to the present embodiment is configured to ensure that the operation of a particular actuator precedes the operation of another actuator. In the configuration shown in FIG. 8, actuator C 12 is a preferred actuator that precedes the other actuators. For the preferred actuator C 12, an instruction value determination section (not shown) determines an instruction value prior to the other actuators (actuator A 2 and actuator B 4). The instruction value represents the fuel injection amount and timing when the preferred actuator is the fuel injection device. When the preferred actuator is the ignition device, the instruction value represents the ignition timing. When the preferred actuator is the throttle, the instruction value represents the throttle opening. The instruction value is determined in accordance with functionality and other requirements for the engine except for torque responsiveness.

The instruction value for the preferred actuator C 12 is converted to a torque signal by a torque conversion section 30, and subtracted from the target torque signal. The resulting target torque signal, which is obtained by subtracting the torque signal equivalent to the instruction value from the original target torque signal, is then distributed to actuators 2, 4 other than the preferred actuator C 12 in the distribution priority order. This ensures that the target torque can be achieved by the overall operations of the actuators 2, 4, 12 (preferred actuator C 12 included) while allowing the preferred actuator C 12 to operate prior to the other actuators.

In the configuration shown in FIG. 8, the scheme for subtracting the torque signal equivalent to the instruction value from the target torque signal corresponds to the "target torque signal correction means" according to the nineteenth aspect of the present invention.

The torque control device according to the present embodiment is configured so that a new function is added to the torque control device according to the first embodiment. However, the new function added to the present embodiment can also be added to the torque control device according to the second embodiment.

Sixth Embodiment

Figure 9:
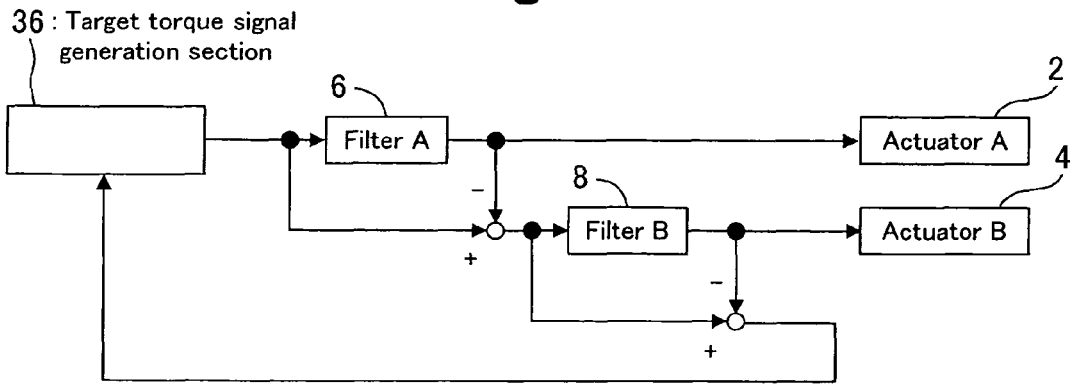
FIG. 9 is a control block diagram illustrating the torque control device according to a sixth embodiment of the present invention.

FIG. 9 is a control block diagram illustrating the torque control device according to a sixth embodiment of the present invention. The torque control device according to the present embodiment is configured so that a new function is added to the torque control device according to the first embodiment. Elements that are included in the configuration shown in FIG. 9 and identical with those of the first embodiment are assigned the same reference numerals as their counterparts.

According to the configuration shown in FIG. 9, a portion of target torque achievable by actuator A 2 is achieved by actuator A 2 while a portion of target torque unachievable by actuator A 2 is achieved by actuator B 4. However, if the target torque signal includes a signal that is outside the passbands of filter A 6 and filter B 8, the target torque corresponding to that signal can be achieved neither by actuator A 2 nor by actuator B 4.

As such being the case, if there is a difference between a signal that has not passed through filter B 8 and a signal that has passed through, the configuration shown in FIG. 9 feeds a difference signal, which represents the above difference, back to a target torque signal generation section 36. The difference signal representing the difference between a signal that has not passed through filter B 8, which is related to the lowest-level actuator B 4, and a signal that has passed through, indicates a signal region of the target torque signal that cannot be handled by the actuators 2, 4. When the difference signal is fed back to the target torque signal generation section 36, target torque signal generation can be accomplished within an implementable signal region to enhance the accuracy of target torque achievement.

In the configuration shown in FIG. 9, the scheme for feeding the difference signal, which represents the difference between a signal that has passed through filter B 8 and a signal that has not passed through, back to the target torque signal generation section 36 corresponds to the "feedback means" according to the ninth aspect of the present invention.

Seventh Embodiment

Figure 10:
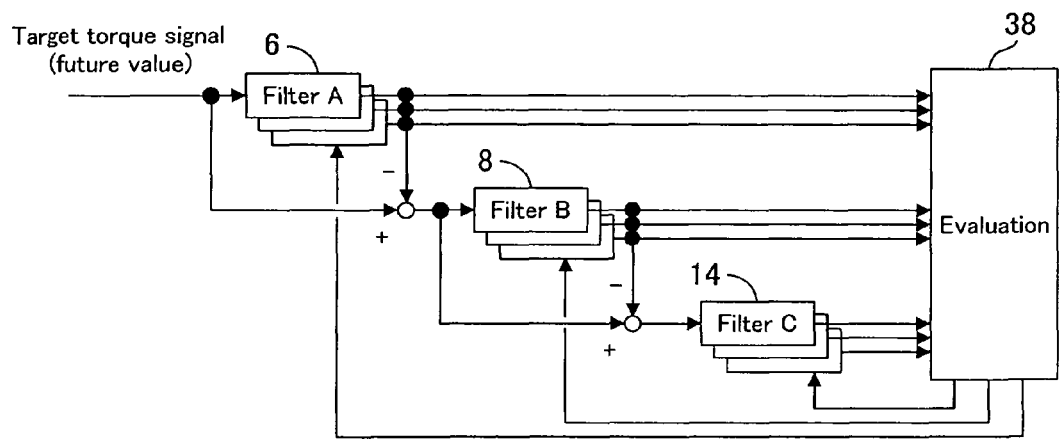
FIG. 10 is a control block diagram illustrating the torque control device according to a seventh embodiment of the present invention.

FIG. 10 is a control block diagram illustrating the torque control device according to a seventh embodiment of the present invention. The torque control device according to the present embodiment is configured so that a new function is added to the torque control device according to the first embodiment. Elements that are included in the configuration shown in FIG. 10 and identical with those of the first embodiment are assigned the same reference numerals as their counterparts.

The configuration shown in FIG. 10 includes a plurality of filters A 6 that differ in signal pass characteristic, a plurality of filters B 8 that differ in signal pass characteristic, and a plurality of filters C 14 that differ in signal pass characteristic. Selecting one of the plurality of filters A 6, one of the plurality of filters B 8, and one of the plurality of filters C 14 and combining the selected filters makes it possible to change the target torque signal distribution to the actuators in accordance with the combination of the filters.

As described later, the torque control device according to the present embodiment predicts changes in the target torque for the engine, and determines the combination of filters 6, 8, 14 in accordance with the predicted target torque changes. When the torque control device functions as described above, the "prediction means" and "combination determination means" according to the tenth aspect of the present invention are implemented.

Figure 11:
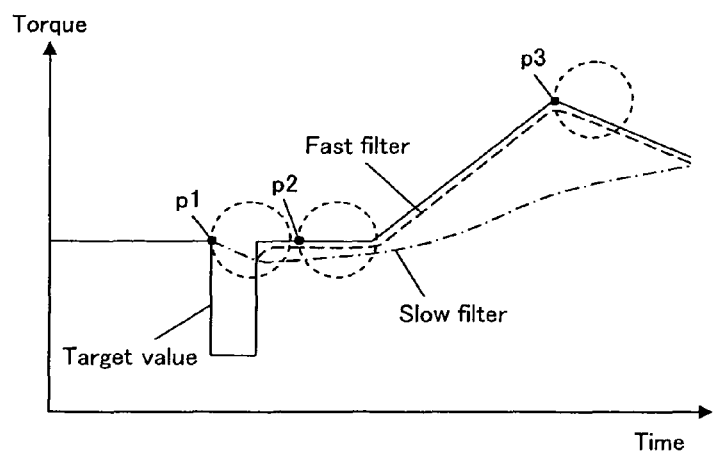
FIG. 11 shows the operation of the torque control device according to the seventh embodiment of the present invention.

FIG. 11 shows typical target torque changes. The target torque is determined while comprehensively considering not only a torque request from the driver but also torque requests from various devices such as a VSC, TRC, and transmission. As shown in the figure, the target torque may change stepwise (decrease and then increase as indicated in the figure). The target torque is converted into a signal. The resulting target torque signal is supplied to the torque control device.

When it is assumed that actuator A is a throttle, and that actuator B is an ignition device, and further that actuator C is a fuel injection device (these actuators are not shown in the figure), the target torque signal is preferentially distributed to the throttle because it has a high distribution priority. However, the response sensitivity of torque to a throttle operation is low. Therefore, if the throttle aggressively moves in the closing direction in accordance with a stepwise decrease in the target torque, the throttle cannot immediately be opened as needed the next time the target torque increases stepwise. In such an instance, the target torque can be effectively achieved by adjusting the ignition timing to compensate for a stepwise decrease without moving the throttle aggressively.

As such being the case, target torque changes are predicted as described earlier, and then the combination of filters 6, 8, 14 is determined in accordance with the predicted target torque changes. Providing a fixed time lag between target torque determination and target torque signal supply makes it possible to predict target torque changes that may occur during a fixed period of time equivalent to the time lag. The fixed period of time corresponds to the time within dotted-line circles that begin at time points p1, p2, and p3 in FIG. 11.

When the combination of filters 6, 8, 14 is to be determined, it is desirable that filter A 6, which has a high distribution priority, be selected first. The guidelines for the selection of filter A 6 will now be described with reference to a case where filter A 6 is selected at time points p1, p2, and p3 in FIG. 11. At first, it is predicted that the target torque will temporarily decrease stepwise at time point p1, but increase stepwise a bit later. In such a situation, the throttle should not aggressively move. Therefore, a filter (a slow filter indicated by a one-dot chain line in FIG. 11) whose cutoff frequency is set to a low frequency is selected at time point p1. Further, it is predicted that the target torque will then increase at time point p2. Therefore, a filter (a fast filter indicated by a broke line in FIG. 11) whose cutoff frequency is set to a high frequency is selected at time point p2 to immediately cope with an increase in the target torque. Furthermore, it is predicted that the target torque will then continuously decrease for a while. Therefore, a filter whose cutoff frequency is set to a high frequency is selected at time point p3. The other filters 6, 8 are selected in the same manner.

After the filters 6, 8, 14 are selected, it is desirable that the resulting combination be evaluated to judge whether it is optimum. The configuration shown in FIG. 10 includes an evaluation section 38, which evaluates the combination of filters 6, 8, 14. Command signals that have passed through the filters 6, 8, 14 enter the evaluation section 38. The evaluation section 38 calculates the torque that is to be achieved by actuator operations based on the command signals. Then, the difference between the calculated torque and target torque is determined to judge whether the combination of selected filters 6, 8, 14 is optimum. The evaluation section 38 feeds the evaluation result back to the filters 6, 8, 14 so that the optimum combination will be determined eventually.

As described above, the torque control device according to the present embodiment is configured so that the target torque signal distribution to each actuator can be changed in accordance with predicted target torque changes. Therefore, the operation of each actuator can be optimized to enhance the accuracy of target torque achievement.

Eighth Embodiment

Figure 12:
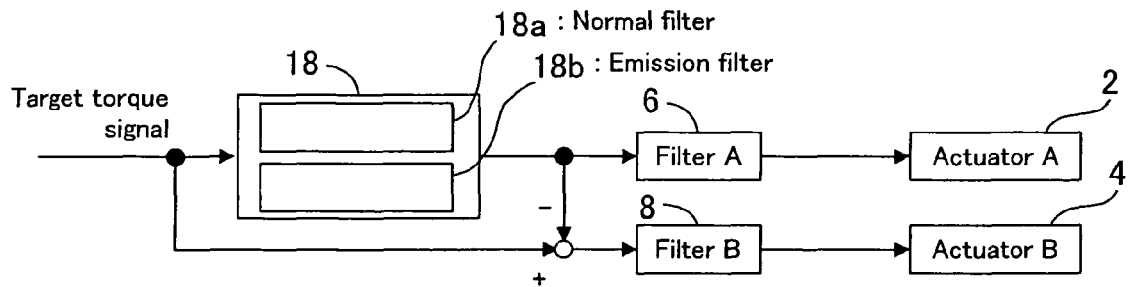
FIG. 12 is a control block diagram illustrating the torque control device according to an eighth embodiment of the present invention.

FIG. 12 is a control block diagram illustrating the torque control device according to an eighth embodiment of the present invention. The torque control device according to the present embodiment is configured so that a new function is added to the torque control device according to the second embodiment. Elements that are included in the configuration shown in FIG. 12 and identical with those of the second embodiment are assigned the same reference numerals as their counterparts.

The configuration shown in FIG. 12 includes two filters 18a, 18b, which are mediation filters 18 differing in signal pass characteristic. The torque control device according to the present embodiment is capable of selectively using either of these two filters 18a, 18b in accordance with the operating status of the engine. As is the case with the second embodiment, the present embodiment assumes that actuator A 2 is a throttle, and that actuator B 4 is an ignition device.

One of the two filters 18a, 18b is a normal filter 18a, and the other is an emission filter 18b. The normal filter 18a has such a signal pass characteristic as to preferentially distribute the target torque signal to the throttle (actuator A) 2. Torque control provided by the throttle does not cause any significant adverse effect, for instance, on knocking, exhaust temperature, or fuel efficiency. Therefore, the normal filter 18a is used under normal conditions.

Figure 13:
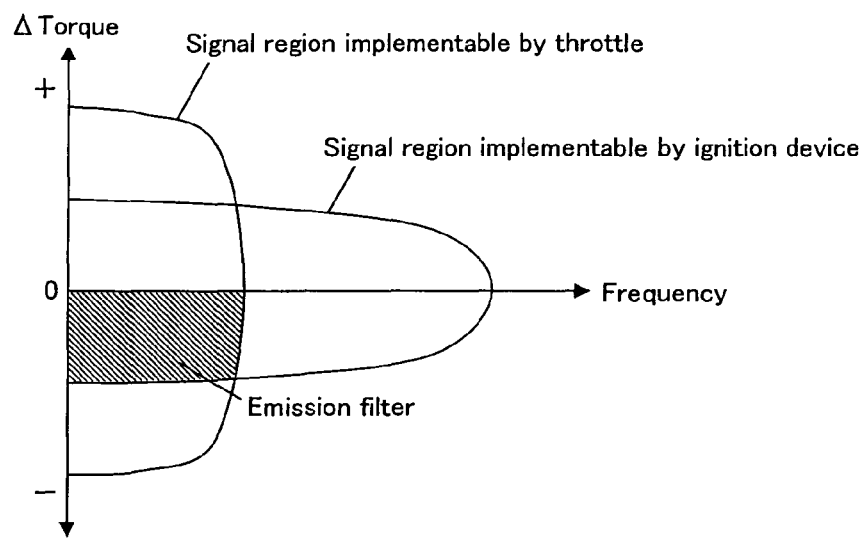
FIG. 13 shows the relationship between a torque region and the signal pass characteristic of an emission filter according to the eighth embodiment of the present invention.

The emission filter 18b is used to provide improved emissions when, for instance, the catalyst temperature is low. The emission filter 18b has such a signal pass characteristic as to preferentially distribute the target torque signal to the ignition device (actuator B) 4 for the purpose of retarding the ignition timing to raise the exhaust temperature. FIG. 13 shows the relationship between a signal region implementable by the throttle, a signal region implementable by the ignition device, and the signal pass characteristic of the emission filter 18b. The vertical axis of a graph shown in FIG. 13 represents a torque change amount (Δ torque), whereas the horizontal axis represents a frequency. The signal pass characteristic of the emission filter 18b is set so that a signal in a signal region implementable by both the throttle and ignition device and indicative of a minus torque change amount is supplied to the ignition device.

Figure 14:
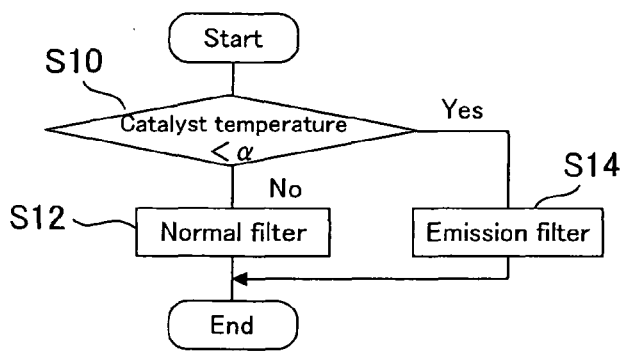
FIG. 14 is a flowchart illustrating a filter selection routine that is executed by the eighth embodiment of the present invention.

The torque control device according to the present embodiment selects either of the two mediation filters 18 by following the routine described by a flowchart in FIG. 14. First of all, step S10 is performed to judge whether the temperature of a catalyst positioned in an exhaust path is lower than a predetermined reference temperature α. The catalyst temperature may be directly measured by a temperature sensor provided for the catalyst or may be predicted from the exhaust temperature. If the judgment result indicates that the catalyst temperature is not lower than the reference temperature α, the routine proceeds to step S12 and selects the normal filter 18a. If, on the other hand, the judgment result indicates that the catalyst temperature is lower than the reference temperature α, the routine proceeds to step S14 and selects the emission filter 18b. The "filter selection means" according to the sixth aspect of the present invention is implemented when the torque control device executes the routine.

When the catalyst is to be warmed up by a conventional method, it is necessary to simultaneously exercise control for increasing an intake air amount in accordance with an ignition timing retard amount, exercise control for retarding the ignition timing to a target retard amount, and exercise control for stabilizing the engine rotation speed. However, the torque control device according to the present embodiment can retard the ignition timing to achieve catalyst warm-up without requiring a conventional complex logic while achieving a target torque.

Ninth Embodiment

Figure 15:
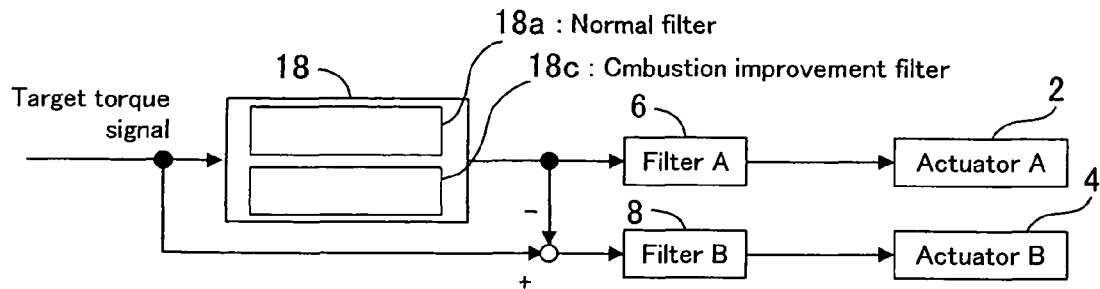
FIG. 15 is a control block diagram illustrating the torque control device according to an ninth embodiment of the present invention.

FIG. 15 is a control block diagram illustrating the torque control device according to a ninth embodiment of the present invention. The torque control device according to the present embodiment is configured so that a new function is added to the torque control device according to the second embodiment. Elements that are included in the configuration shown in FIG. 15 and identical with those of the second embodiment are assigned the same reference numerals as their counterparts.

The configuration shown in FIG. 15 includes two filters 18a, 18c, which are mediation filters 18 differing in signal pass characteristic. The torque control device according to the present embodiment is capable of selectively using either of these two filters 18a, 18c in accordance with the operating status of the engine. As is the case with the second embodiment, the present embodiment assumes that actuator A 2 is a throttle, and that actuator B 4 is an ignition device.

One of the two filters 18a, 18c is a normal filter 18a, and the other is a combustion improvement filter 18c. The normal filter 18a has such a signal pass characteristic as to preferentially distribute the target torque signal to the throttle (actuator A) 2.

Figure 16:
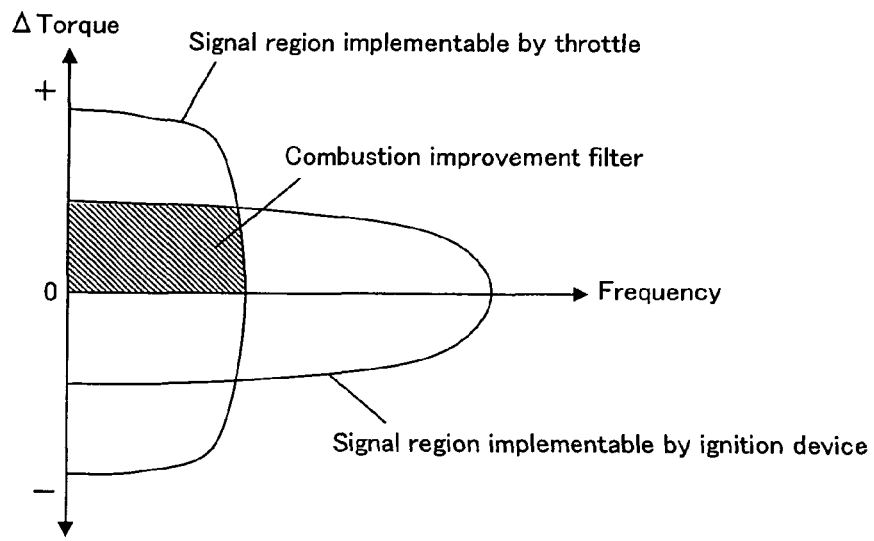
FIG. 16 shows the relationship between a torque region and the signal pass characteristic of a combustion improvement filter according to the ninth embodiment of the present invention.

The combustion improvement filter 18c is used to provide combustion improvement when, for instance, the fuel properties are poor. The combustion improvement filter 18c has such a signal pass characteristic as to preferentially distribute the target torque signal to the ignition device (actuator B) 4 for the purpose of advancing the ignition timing to provide improved combustion. FIG. 16 shows the relationship between a signal region implementable by the throttle, a signal region implementable by the ignition device, and the signal pass characteristic of the combustion improvement filter 18c. The vertical axis of a graph shown in FIG. 16 represents a torque change amount (Δ torque), whereas the horizontal axis represents a frequency. The signal pass characteristic of the combustion improvement filter 18c is set so that a signal in a signal region implementable by both the throttle and ignition device and indicative of a plus torque change amount is supplied to the ignition device.

Figure 17:
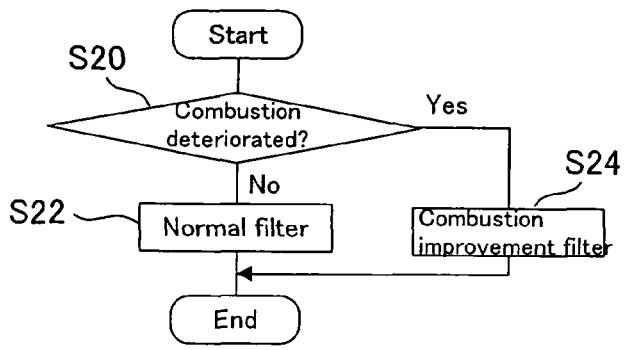
FIG. 17 is a flowchart illustrating a filter selection routine that is executed by the ninth embodiment of the present invention.

The torque control device according to the present embodiment selects either of the two mediation filters 18 by following the routine described by a flowchart in FIG. 17. First of all, step S20 is performed to judge whether deteriorated combustion is detected. Deteriorated combustion can be indirectly detected from changes in the engine rotation speed or torque. If the judgment result does not indicate that deteriorated combustion is detected, the routine proceeds to step S22 and selects the normal filter 18a. If, on the other hand, the judgment result indicates that deteriorated combustion is detected, the routine proceeds to step S24 and selects the combustion improvement filter 18c. The "filter selection means" according to the sixth aspect of the present invention is implemented when the torque control device executes the routine.

If the combustion improvement filter 18c is not available, the throttle opens widely irrespective of combustion deterioration when the target torque increases. However, if the throttle opening is increased when combustion is deteriorated, the intake port negative pressure decreases to the detriment of fuel atomization, thereby promoting combustion deterioration. Meanwhile, the torque control device according to the present embodiment uses the combustion improvement filter 18c to distribute the target torque signal when deteriorated combustion is detected. Therefore, the ignition timing can be advanced to provide improved combustion while achieving the target torque.

Tenth Embodiment

The torque control device according to a tenth embodiment of the present invention is characterized in that its configuration is a combination of the configuration of the eighth embodiment (the configuration shown in FIG. 12) and the configuration of the ninth embodiment (the configuration shown in FIG. 15). More specifically, it has three mediation filters 18 differing in signal pass characteristic, that is, the normal filter 18a, emission filter 18b, and combustion improvement filter 18c. The features of these three filters are as described earlier.

Figure 18:
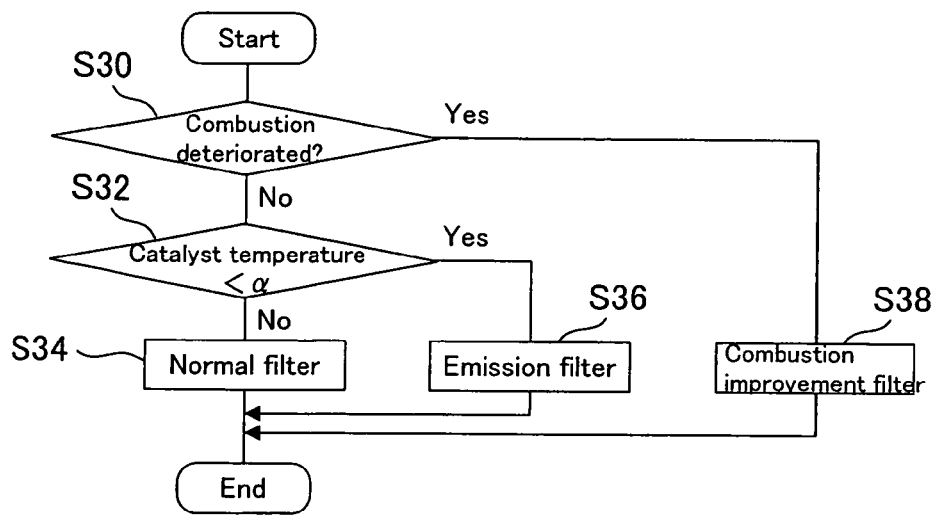
FIG. 18 is a flowchart illustrating a filter selection routine that is executed by a tenth embodiment of the present invention.

The torque control device according to the present embodiment selects one of the three mediation filters 18 by following the routine described by a flowchart in FIG. 18. First of all, step S30 is performed to judge whether deteriorated combustion is detected. If the judgment result indicates that deteriorated combustion is detected, the routine proceeds to step S38 and selects the combustion improvement filter 18c. If, on the other hand, the judgment result does not indicate that deteriorated combustion is detected, the routine proceeds to step S32 and judges whether the temperature of the catalyst positioned in the exhaust path is lower than the predetermined reference temperature α. If the judgment result indicates that the catalyst temperature is lower than the reference temperature α, the routine proceeds to step S36 and selects the emission filter 18b. If, on the other hand, the catalyst temperature is not lower than the reference temperature α, the routine proceeds to step S34 and selects the normal filter 18a. The "filter selection means" according to the sixth aspect of the present invention is implemented when the torque control device executes the routine.

The torque control device according to the present embodiment can retard the ignition timing to warm up the catalyst while achieving a target torque, and advance the ignition timing to provide improved combustion while achieving the target torque.

Eleventh Embodiment

Figure 22:
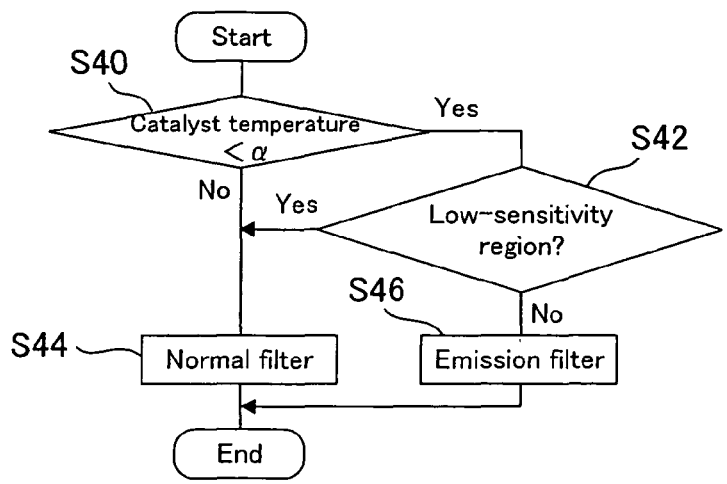
FIG. 22 is a flowchart illustrating a filter selection routine that is executed by the eleventh embodiment of the present invention.

The torque control device according to an eleventh embodiment of the present invention is characterized in that it is based on the configuration of the eighth embodiment (the configuration shown in FIG. 12) and follows a routine described by a flowchart in FIG. 22 to select a mediation filter 18. The present embodiment makes a mediation filter selection in accordance with the quality of predicted torque response sensitivity as well as the catalyst temperature.

Figure 19:
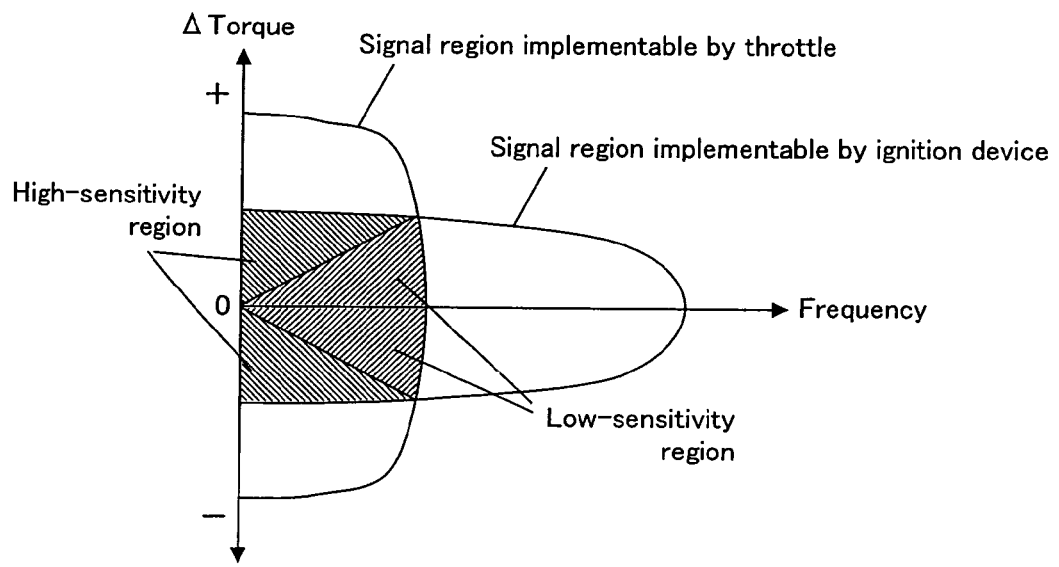
FIG. 19 shows the relationship between torque response sensitivity and a torque region according to an eleventh embodiment of the present invention.
Figure 20:
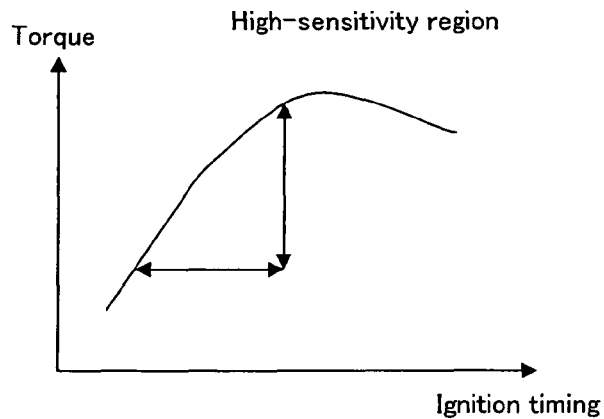
FIG. 20 shows the relationship between a torque change amount and a ignition timing change amount in the high-sensitivity region of FIG. 19.
Figure 21:
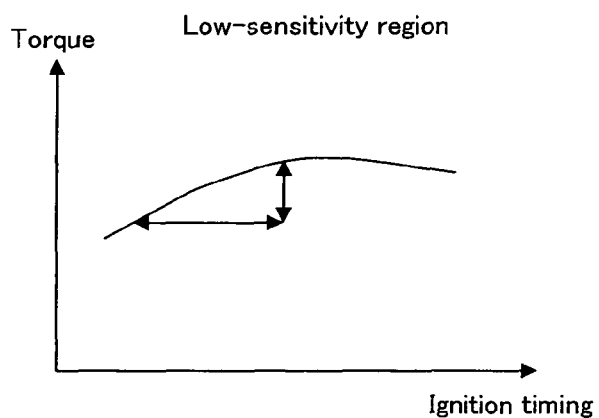
FIG. 21 shows the relationship between a torque change amount and a ignition timing change amount in the low-sensitivity region of FIG. 19.

FIG. 19 shows the relationship between torque response sensitivity and a signal region implementable by both the throttle and ignition device. The signal region implementable by both the throttle and ignition device can be divided into a high-sensitivity region and a low-sensitivity region depending on the quality of torque response sensitivity. The torque response sensitivity means the response sensitivity of torque to an ignition device operation amount, that is, an ignition timing change amount. In the high-sensitivity region, the torque change amount is large relative to the ignition timing change amount as shown in FIG. 20. In the low-sensitivity region, on the other hand, the torque change amount is small relative to the ignition timing change amount as shown in FIG. 21. The present embodiment uses the emission filter 18b only when the target torque signal is within the high-sensitivity region.

First of all, the routine shown in FIG. 22 performs step S40 to judge whether the temperature of the catalyst positioned in the exhaust path is lower than the predetermined reference temperature α. If the judgment result indicates that the catalyst temperature is not lower than the reference temperature α, the routine proceeds to step S44 and selects the normal filter 18a. If, on the other hand, the judgment result indicates that the catalyst temperature is lower than the reference temperature α, the routine proceeds to step S42 and judges whether the target torque signal is a signal in the low-sensitivity region. If the target torque signal is a signal in the low-sensitivity region, the routine proceeds to step S44 and selects the normal filter 18a. If, on the other hand, the target torque signal is a signal in the high-sensitivity region, the routine proceeds to step S46 and selects the emission filter 18b. The "filter selection means" according to the sixth and seventh aspects of the present invention is implemented when the torque control device executes the routine.

When a mediation filter 18 is to be selected in accordance with the necessity for catalyst warm-up, the torque control device according to the present invention can prevent the ignition timing from being unduly retarded and maintain a high degree of engine control robustness by considering the quality of predicted torque response sensitivity prevailing upon an ignition timing change. Further, the torque control device according to the present invention can provide highly accurate torque control by using the throttle for torque control purposes instead of using the ignition device having low torque response sensitivity.

The torque control device according to the present embodiment is configured so that a new function is added to the torque control device according to the eighth embodiment. However, the function added to the present embodiment, that is, the capability of selecting a mediation filter 18 in accordance with the quality of torque response sensitivity, can also be added to the torque control device according to the ninth or tenth embodiment.

Twelfth Embodiment

Figure 23:
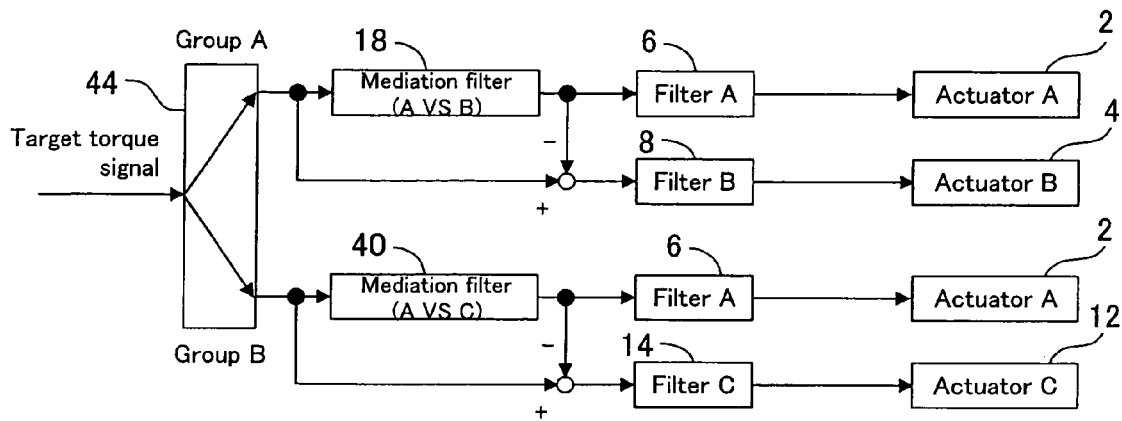
FIG. 23 is a control block diagram illustrating the torque control device according to a twelfth embodiment of the present invention.

FIG. 23 is a control block diagram illustrating the torque control device according to a twelfth embodiment of the present invention. The torque control device according to the present embodiment is configured so that a new function is added to the torque control device according to the second embodiment. Elements that are included in the configuration shown in FIG. 23 and identical with those of the second embodiment are assigned the same reference numerals as their counterparts.

In the configuration shown in FIG. 23, control groups A and B are set. Control group A exercises torque control by using actuator A 2 and actuator B 4. Control group B exercises torque control by using actuator A 2 and actuator C 12. The configuration shown in FIG. 23 includes a selection section 44, which selects either control group A or control group B and supplies a target torque signal to the selected control group.

Control group A includes filter A 6, which allows only a signal matching the operation characteristics of actuator A 2 to pass through as a command signal; filter B 8, which allows only a signal matching the operation characteristics of actuator B 4 to pass through as a command signal; and a mediation filter 18, which distributes the target torque signal to the actuators 2, 4. When the selection section 44 selects control group A, the target torque signal that has passed through the mediation filter 18 is supplied to filter A 6, and the signal that has passed through filter A 6 enters actuator A 2 as a command signal. A difference signal obtained by subtracting the signal that has passed through the mediation filter 18 from the signal that has not passed through is supplied to filter B 8, and the signal that has passed through filter B 8 enters actuator B 4 as a command signal.

Control group B includes filter A 6, which allows only a signal matching the operation characteristics of actuator A 2 to pass through as a command signal; filter C 14, which allows only a signal matching the operation characteristics of actuator C 12 to pass through as a command signal; and a mediation filter 40, which distributes the target torque signal to the actuators 2, 12. The mediation filter 40 allows the passage of only a signal matching a particular signal region within a signal region where actuator A 2 is operative. When the selection section 44 selects control group B, the target torque signal that has passed through the mediation filter 40 is supplied to filter A 6, and the signal that has passed through filter A 6 enters actuator A 2 as a command signal. A difference signal obtained by subtracting the signal that has passed through the mediation filter 18 from the signal that has not passed through is supplied to filter C 14, and the signal that has passed through filter C 14 enters actuator C 12 as a command signal.

Figure 24:
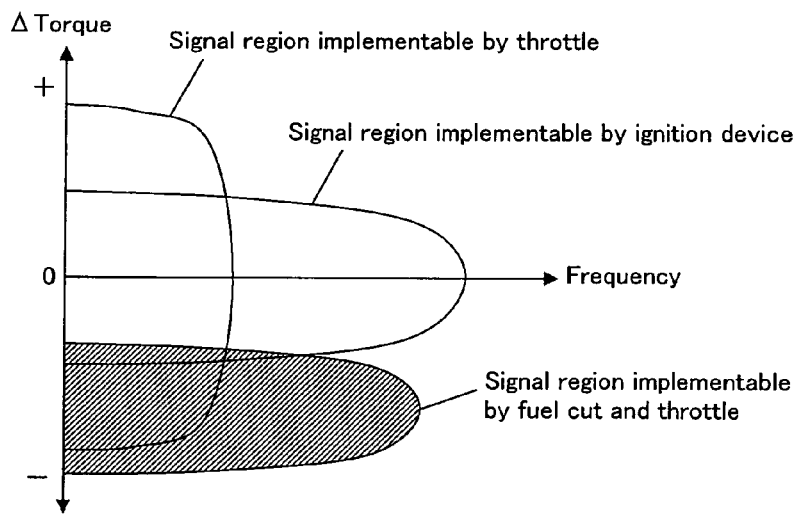
FIG. 24 shows a torque region implementable by the twelfth embodiment of the present invention.

The present embodiment assumes that actuator A 2 is a throttle, and that actuator B 4 is an ignition device, and further that actuator C 12 is a fuel injection device. The fuel injection device can perform a fuel cut to greatly reduce the torque. FIG. 24 shows the relationship between a signal region implementable by the throttle, a signal region implementable by the ignition device, and a signal region implementable by a fuel cut and throttle. The vertical axis of a graph shown in FIG. 24 represents a torque change amount (Δ torque), whereas the horizontal axis represents a frequency.

The signal region implementable by the throttle and the signal region implementable by the ignition device, which are shown in FIG. 24, can be implemented by selecting control group A. On the other hand, the signal region implementable by a fuel cut and throttle can be implemented by selecting control group B. As is obvious from FIG. 24, torque control can be provided over a wide dynamic range by properly selecting a control group for use in torque control. This makes it possible to enhance the accuracy of target torque achievement.

Figure 25:
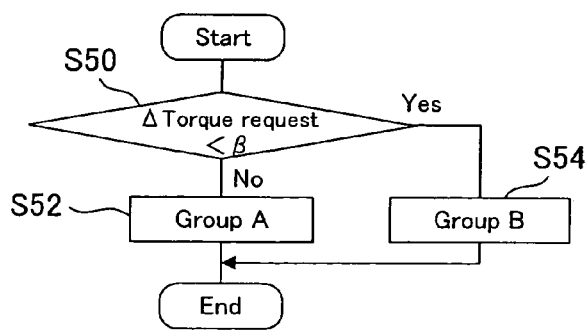
FIG. 25 is a flowchart illustrating a filter selection routine that is executed by the twelfth embodiment of the present invention.

The torque control device according to the present embodiment selects a control group by following the routine described by a flowchart in FIG. 25. First of all, step S50 is performed to judge whether a target torque change amount (Δ torque request) is smaller than a predetermined reference value β. The reference value β is a minus value. If the judgment result indicates that the Δ torque request is smaller than the reference value β, that is, if the requested torque decrease is significant, the routine proceeds to step S54 and selects control group B. A throttle control operation can then be combined with a fuel cut operation to greatly decrease the torque. If, on the other hand, the Δ torque request is not smaller than the reference value β, that is, if a small torque decrease or no torque decrease is requested, the routine proceeds to step S52 and selects control group A. The "group selection means" according to the sixteenth or seventeenth aspect of the present invention is implemented when the torque control device executes the routine.

The torque control device according to the present embodiment is configured so that a new function is added to the torque control device according to the second embodiment. However, the function added to the present embodiment can also be added to the torque control device according to the first embodiment.

Thirteenth Embodiment

Figure 26:
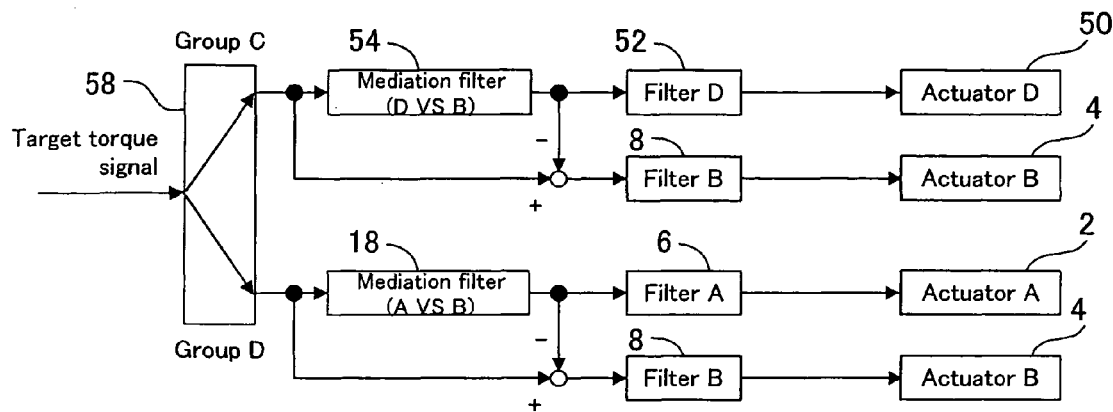
FIG. 26 is a control block diagram illustrating the torque control device according to a thirteenth embodiment of the present invention.

FIG. 26 is a control block diagram illustrating the torque control device according to a thirteenth embodiment of the present invention. The torque control device according to the present embodiment is configured so that a new function is added to the torque control device according to the second embodiment. Elements that are included in the configuration shown in FIG. 26 and identical with those of the second embodiment are assigned the same reference numerals as their counterparts.

In the configuration shown in FIG. 26, control groups C and D are set. Control group C exercises torque control by using actuator D 50 and actuator B 4. Control group D exercises torque control by using actuator A 2 and actuator B 4. The configuration shown in FIG. 26 includes a selection section 58, which selects either control group C or control group D and supplies a target torque signal to the selected control group.

Control group C includes filter D 52, which allows only a signal matching the operation characteristics of actuator D 50 to pass through as a command signal; filter B 8, which allows only a signal matching the operation characteristics of actuator B 4 to pass through as a command signal; and a mediation filter 54, which distributes the target torque signal to the actuators 50, 4. The mediation filter 54 allows the passage of only a signal matching a particular signal region within a signal region where actuator D 50 is operative. When the selection section 58 selects control group C, the target torque signal that has passed through the mediation filter 54 is supplied to filter D 52, and the signal that has passed through filter D 52 enters actuator D 50 as a command signal. A difference signal obtained by subtracting the signal that has passed through the mediation filter 54 from the signal that has not passed through is supplied to filter B 8, and the signal that has passed through filter B 8 enters actuator B 4 as a command signal.

Control group D includes filter A 6, which allows only a signal matching the operation characteristics of actuator A 2 to pass through as a command signal; filter B 8, which allows only a signal matching the operation characteristics of actuator B 4 to pass through as a command signal; and a mediation filter 18, which distributes the target torque signal to the actuators 2, 4. When the selection section 44 selects control group D, the target torque signal that has passed through the mediation filter 18 is supplied to filter A 6, and the signal that has passed through filter A 6 enters actuator A 2 as a command signal. A difference signal obtained by subtracting the signal that has passed through the mediation filter 18 from the signal that has not passed through is supplied to filter B 8, and the signal that has passed through filter B 8 enters actuator B 4 as a command signal.

The present embodiment assumes that actuator A 2 is a throttle, and that actuator B 4 is an ignition device, and further that actuator D 50 is a variable lift mechanism. The variable lift mechanism can vary the lift amount of an intake valve. The variable lift mechanism makes it possible to control the amount of air taken into a cylinder by regulating the lift amount of the intake valve without using the throttle. When the intake air amount is controlled by the variable lift mechanism, the throttle can be used for other purposes such as intake port pressure control. The torque control device according to the present embodiment basically uses the variable lift mechanism to provide torque control, and switches to throttle-based torque control only when the variable lift mechanism is inoperative (when, for instance, a failure is encountered or a hydraulically-driven variable lift mechanism is cold).

Figure 27:
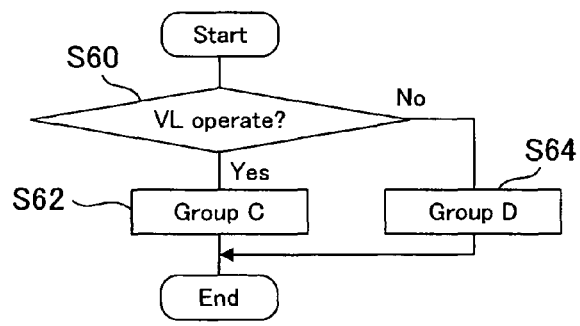
FIG. 27 is a flowchart illustrating a filter selection routine that is executed by the thirteenth embodiment of the present invention.

The torque control device according to the present embodiment selects a control group by following the routine described by a flowchart in FIG. 27. First of all, step S60 is performed to judge whether the variable lift mechanism (VL) can operate normally. If the judgment result indicates that the variable lift mechanism can operate normally, the routine proceeds to step S62 and selects control group C. If, on the other hand, the variable lift mechanism cannot operate normally, the routine proceeds to step S64 and selects control group D. The "group selection means" according to the sixteenth or eighteenth aspect of the present invention is implemented when the torque control device executes the routine.

The torque control device according to the present embodiment is configured so that a new function is added to the torque control device according to the second embodiment. However, the function added to the present embodiment can also be added to the torque control device according to the first embodiment.

Fourteenth Embodiment

Figure 28:
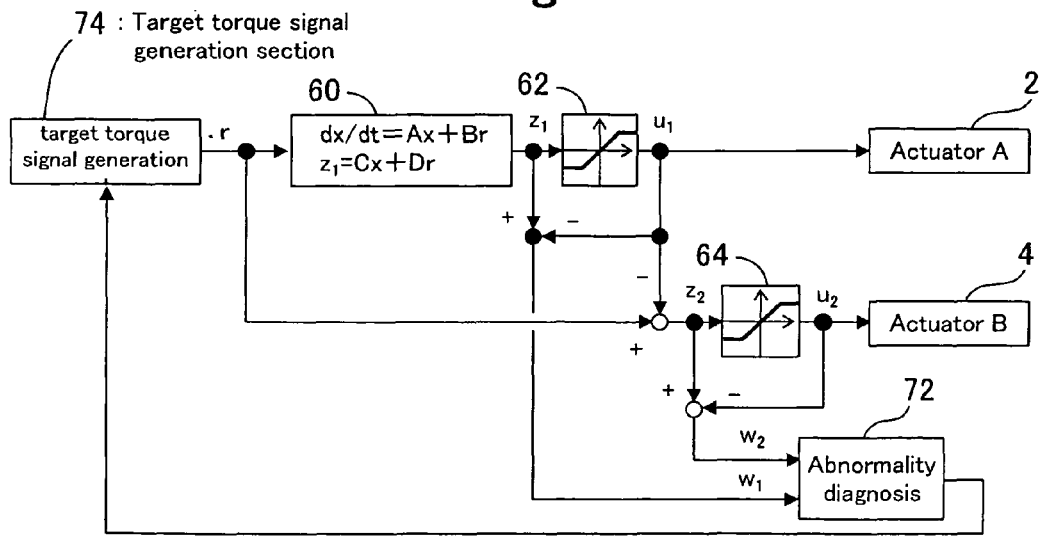
FIG. 28 is a control block diagram illustrating the torque control device according to a fourteenth embodiment of the present invention.

FIG. 28 is a control block diagram illustrating the torque control device according to a fourteenth embodiment of the present invention. The engine includes a plurality of actuators 2, 4 related to its torque control. These actuators 2, 4 operate in accordance with input command signals, thereby causing the engine to achieve torque according to the operations of the actuators 2, 4.

Various torque requests are sent to an engine control device (this control device is at a higher level than the torque control device). The torque requests include not only a request from the driver but also requests from various devices such as a VSC, TRC, and transmission. The engine control device compiles the various torque requests into an engine target torque, converts the engine target torque into a digital target torque signal, and supplies the obtained target torque signal to the torque control device. In the configuration shown in FIG. 28, a target torque signal generation section 74 generates the target torque signal.

The torque control device distributes the target torque signal to the two actuators 2, 4 as command signals. A low-pass filter 60 and saturation elements 62, 64 are used to distribute the target torque signal. The low-pass filter 60 and saturation element 62 are mounted on a signal input section of actuator A 2. The low-pass filter 60 allows the passage of signals having frequencies at which actuator A 2 is operative or to be operated. The saturation element 62 limits signals to amplitudes at which actuator A 2 is operative or to be operated. The saturation element 64 is mounted on a signal input section of actuator B 4 to limit signals to amplitudes at which actuator B 4 is operative or to be operated. The low-pass filter 60 and saturation element 62 constitute the "signal processing filter" for actuator A 2. The saturation element 64 corresponds to the "signal processing filter" for actuator B 4.

In the configuration shown in FIG. 28, the target torque signal enters the low-pass filter 60 without being modified. After the frequency range of the target torque signal is limited by the low-pass filter 60, the saturation element 62 limits the magnitude of the target torque signal. The signal that has passed through the saturation element 62 enters actuator A 2 as a command signal. A difference signal obtained by subtracting the signal that has passed through the saturation element 62 from the signal that has not passed through the low-pass filter 60 enters the saturation element 64, which correlates to low-level actuator B 4. This difference signal is a portion of target torque signal that cannot or will not be implemented by actuator A 2. The difference signal enters the saturation element 64. The signal that has passed through the saturation element 64 enters actuator B 4 as a command signal.

According to the configuration shown in FIG. 28, a portion of target torque achievable by actuator A 2 is achieved by actuator A 2 while a portion of target torque unachievable by actuator A 2 is achieved by actuator B 4. However, if the target torque signal includes signals that are to be cut by the saturation element 62 and saturation element 64, the target torque corresponding to such signals can be achieved neither by actuator A 2 nor by actuator B 4. The reason is that the signals are outside a region in which actuator A 2 and actuator B 4 are operative.

As such being the case, if there is a difference between a signal z1 that has not passed through the saturation element 62 and a signal u1 that has passed through, the configuration shown in FIG. 28 inputs a difference signal w1, which represents the aforementioned difference, into an abnormality diagnosis section 72. Further, if there is a difference between a signal z2 that has not passed through the saturation element 64 and a signal u2 that has passed through, a difference signal w2 representing the aforementioned difference enters the abnormality diagnosis section 72. The difference signal w1 is a portion of target torque signal that is outside a region where actuator A 2 is operative. The difference signal w2 is a portion of target torque signal that is outside a region where actuator B 4 is operative.

The abnormality diagnosis section 72 feeds these difference signals w1, w2 back into the target torque signal generation section 74. The target torque signal generation section 74 limits the target torque signal in accordance with the fed-back difference signals w1, w2 or prompts the various devices such as the VSC, TRC, and transmission to reduce the requested torque. This makes it possible to limit the target torque signal within an achievable range and enhance the accuracy of target torque achievement.

Limiting the magnitude of the target torque signal eventually eliminates the difference between the signal z1 that has not passed through the saturation element 62 and the signal u1 that has passed through, and the difference between the signal z2 that has not passed through the saturation element 64 and the signal u2 that has passed through. However, if the target torque signal generation function of the target torque signal generation section 74 is impaired, the above differences will never be eliminated.

The abnormality diagnosis section 72 diagnoses an abnormality existing in the target torque signal generation section 74 in accordance with the input difference signals w1, w2. More specifically, the abnormality diagnosis section 72 measures the elapsed time from the instant at which a difference arises between the signal z1 that has not passed through the saturation element 62 and the signal u1 that has passed through. If the difference signal w1 does not decrease to zero within a predetermined period of time, the abnormality diagnosis section 72 concludes that the target torque signal generation section 74 is abnormal. Further, the abnormality diagnosis section 72 measures the elapsed time from the instant at which a difference arises between the signal z2 that has not passed through the saturation element 64 and the signal u2 that has passed through. If the difference signal w2 does not decrease to zero within a predetermined period of time, the abnormality diagnosis section 72 concludes that the target torque signal generation section 74 is abnormal.

In the configuration shown in FIG. 28, the scheme for feeding the difference signals w1, w2 back to the target torque signal generation section 74 corresponds to the "feedback means" according to the eleventh aspect of the present invention. The abnormality diagnosis section corresponds to the "abnormality judgment means" according to the twelfth aspect of the present invention.

The torque control device according to the present embodiment can be modified as described below. In the modified embodiment described below, the abnormality diagnosis section 72 corresponds to the "abnormality judgment means" according to the thirteenth aspect of the present invention.

In the configuration shown in FIG. 28, the modified embodiment derived from the fourteenth embodiment limits the maximum and minimum values of the saturation element 62 in accordance with a range of torque changes brought about by an operation of actuator A 2. It means that actuator A 2 does not perform a desired operation when there is a difference between the signal z1 that has not passed through the saturation element 62 and the signal u1 that has passed through. The abnormality diagnosis section 72 can diagnose whether actuator A 2 is operating normally by checking whether the difference signal w1 is 0.

Alternatively, the modified embodiment derived from the fourteenth embodiment may limit the maximum and minimum values of the saturation element 64 in accordance with a range of torque changes brought about by an operation of actuator B 4. It means that actuator B 4 does not perform a desired operation when there is a difference between the signal z2 that has not passed through the saturation element 64 and the signal u2 that has passed through. The abnormality diagnosis section 72 can diagnose whether actuator B 4 is operating normally by checking whether the difference signal w2 is 0.

Fifteenth Embodiment

Figure 29:
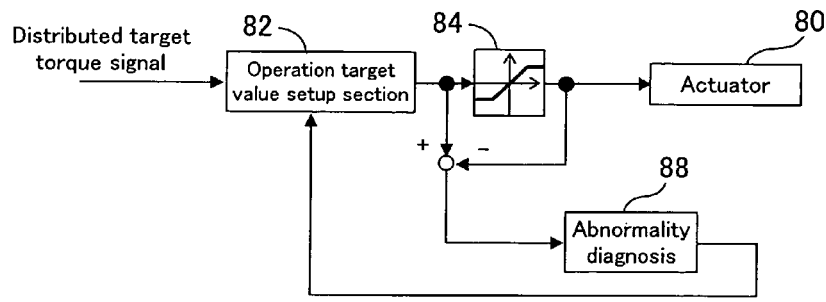
FIG. 29 is a control block diagram illustrating the torque control device according to a fifteenth embodiment of the present invention.

FIG. 29 is a control block diagram illustrating the torque control device according to a fifteenth embodiment of the present invention. The engine includes a plurality of actuators related to its torque control. The torque control device distributes a target torque signal according to the engine's target torque as command signals for various actuators in a predetermined distribution priority order. The configuration shown in FIG. 29 is for processing the distributed target torque signal. Although the subsequent description deals with one actuator 80, the same configuration is employed for the other actuator.

As shown in FIG. 29, the distributed target torque signal (command signal) enters an operation target value setup section 82. The operation target value setup section 82 sets an operation target value for the actuator 80 in accordance with the command signal. The operation target value represents the throttle opening when the actuator 80 is a throttle or represents the ignition timing when the actuator 80 is an ignition device. The saturation element 84 limits the magnitude of the operation target value setting within a range within which the actuator 80 is operative. The operation target value that has passed through the saturation element 84 enters the actuator 80.

If there is a difference between the operation target value that has not passed through the saturation element 84 and the operation target value that has passed through, the configuration shown in FIG. 29 inputs the value of the difference into an abnormality diagnosis section 88. This difference value represents a portion of operation target value that is outside the operation range of the actuator 80. The abnormality diagnosis section 88 feeds the difference value back into the operation target value setup section 82. In accordance with the fed-back difference value, the operation target value setup section 82 limits the operation target value. This makes it possible to limit the operation target value within a range achievable by the actuator 80.

As the operation target value setup section 82 limits the magnitude of the operation target value, the difference between the operation target value that has not passed through the saturation element 84 and the operation target value that has passed through will be eliminated eventually. However, if the function of the operation target value setup section 82 is impaired, the difference will never be eliminated. In accordance with the input difference value, the abnormality diagnosis section 88 diagnoses an abnormality existing in the operation target value setup section 82. More specifically, the abnormality diagnosis section 88 measures the elapsed time from the instant at which a difference arises between the operation target value that has not passed through the saturation element 84 and the operation target value that has passed through. If the difference value does not decrease to zero within a predetermined period of time, the abnormality diagnosis section 88 concludes that the operation target value setup section 82 is abnormal.

The configuration of the torque control device according to the present embodiment can be combined with the configuration of any one of the first to fourteenth embodiments, which have been described earlier.

Sixteenth Embodiment

Figure 30:
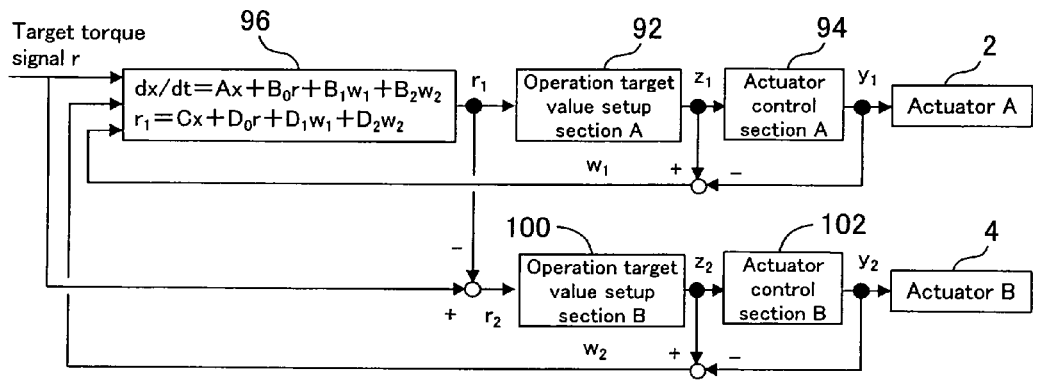
FIG. 30 is a control block diagram illustrating the torque control device according to a sixteenth embodiment of the present invention.

FIG. 30 is a control block diagram illustrating the torque control device according to a sixteenth embodiment of the present invention. The engine includes a plurality of actuators 2, 4 related to its torque control. These actuators 2, 4 operate in accordance with input command signals, thereby causing the engine to achieve torque according to the operations of the actuators 2, 4.

Various torque requests are sent to an engine control device (this control device is at a higher level than the torque control device). The torque requests include not only a request from the driver but also requests from various devices such as a VSC, TRC, and transmission. The engine control device compiles the various torque requests into an engine target torque, converts the engine target torque into a digital target torque signal, and supplies the obtained target torque signal r to the torque control device.

The torque control device distributes the target torque signal r to the two actuators 2, 4 as command signals. A low-pass filter 96 is used to distribute the target torque signal r. The signal pass characteristic of the low-pass filter 96 is expressed by a transfer function that is indicated by Equations (1) and (2) below. It should be noted that A, B0, B1, and B2 in Equation (1) and C, D0, D1, and D2 in Equation (2) are constants.

$$dx/dt = Ax + B0r + B1w1 + B2w2 \quad (1)$$

$$r1 = Cx + D0r + D1w1 + D2w2 \quad (2)$$

In the configuration shown in FIG. 30, the target torque signal r enters the low-pass filter 96. The low-pass filter 96 limits the frequency range of the target torque signal r. The signal r1 that has passed through the low-pass filter 96 enters operation target value setup section A 92 as a command signal for actuator A 2. Operation target value setup section A 92 sets an operation target value z1 for actuator A 2 in accordance with the command signal r1. If actuator A 2 is a throttle, the operation target value z1 represents the opening of the throttle. The operation target value z1 enters actuator control section A 94. Actuator control section A 94 controls the operation of actuator A 2 in such a manner as to achieve the operation target value z1.

A signal r2 that is obtained by subtracting the command signal r1 for actuator A 2 from the target torque signal r enters operation target value setup section B 100 as a command signal for actuator B 4. Operation target value setup section B 100 sets an operation target value z2 for actuator B 4 in accordance with the command signal r2. If actuator B 4 is an ignition device, the operation target value z2 represents the ignition timing. The operation target value z2 enters actuator control section B 102. Actuator control section B 102 controls the operation of actuator B 4 in such a manner as to achieve the operation target value z2.

The configuration shown in FIG. 30 causes actuator A 2 to realize a low-frequency component of the target torque signal r and causes actuator B 4 to realize a high-frequency component. However, if the signal pass characteristic of the low-pass filter 96 is improperly set, the command signal r1 distributed to actuator A 2 may be outside a region where actuator A 2 is operative. In such an instance, the difference signal w1 arises between the operation target value z1 and actual value y1 of actuator A 2. Further, the command signal r2 distributed to actuator B 4 may be outside a region where actuator B 4 is operative. In such an instance, the difference signal w2 arises between the operation target value z2 and actual value y2 of actuator B 4.

In the configuration shown in FIG. 30, the difference signals w1, w2 are fed back to the transfer function of the low-pass filter 96 to correct the signal pass characteristic. When the signal pass characteristic of the low-pass filter 96 is corrected, it is possible to distribute the target torque signal r without exceeding the limits of regions where the actuators 2, 4 are operative, thereby enhancing the accuracy of target torque achievement. When the actual value y1 of actuator A 2 agrees with its operation target value z1 and the actual value y2 of actuator B 4 agrees with its operation target value z2, a feedback loop breaks down to maintain the current signal pass characteristic of the low-pass filter 96.

In the configuration shown in FIG. 30, the scheme for feeding the difference signals w1, w2 back to the transfer function of the low-pass filter 96 corresponds to the "feedback means" according to the fourteenth aspect of the present invention.

Seventeenth Embodiment

Figure 31:
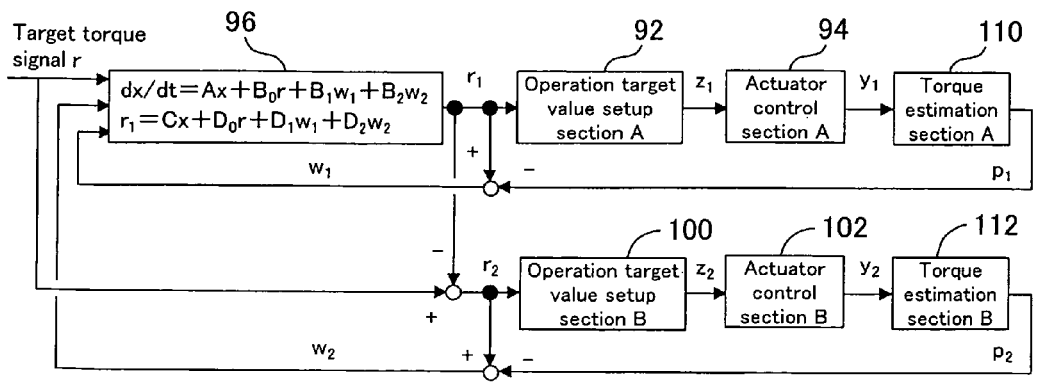
FIG. 31 is a control block diagram illustrating the torque control device according to a seventeenth embodiment of the present invention.

FIG. 31 is a control block diagram illustrating the torque control device according to a seventeenth embodiment of the present invention. The torque control device according to the present embodiment is obtained by modifying the torque control device according to the sixteenth embodiment. Elements that are included in the configuration shown in FIG. 31 and identical with those of the sixteenth embodiment are assigned the same reference numerals as their counterparts.

The configuration shown in FIG. 31 includes torque estimation section A 110, which estimates an actual torque p1 that is achieved by an operation of actuator A. Torque estimation section A 110 estimates the actual torque p1 from the actual value y1 of the operation of actuator A. The configuration also includes torque estimation section B 112, which estimates an actual torque p2 that is achieved by an operation of actuator B. Torque estimation section A 110 estimates the actual torque p2 from the actual value y2 of the operation of actuator B.

The configuration shown in FIG. 31 causes actuator A to realize a low-frequency component of the target torque signal r and causes actuator B to realize a high-frequency component. However, if the signal pass characteristic of the low-pass filter 96 is improperly set, the command signal r1 distributed to actuator A may be outside a region where actuator A is operative. In such an instance, the difference signal w1 arises between the command signal (the target torque to be achieved by actuator A) r1 and the actual torque p1. Further, the command signal r2 distributed to actuator B may be outside a region where actuator B is operative. In such an instance, the difference signal w2 arises between the command signal (the target torque to be achieved by actuator B) r2 and the actual torque p2.

In the configuration shown in FIG. 31, the difference signals w1, w2 are fed back to the transfer function of the low-pass filter 96 to correct the signal pass characteristic. When the signal pass characteristic of the low-pass filter 96 is corrected, it is possible to distribute the target torque signal r without exceeding the limits of regions where the actuators are operative, thereby enhancing the accuracy of target torque achievement. When the actual torque p1 agrees with the command signal r1 for actuator A and the actual torque p2 agrees with the command signal r2 for actuator B, the feedback loop breaks down to maintain the current signal pass characteristic of the low-pass filter 96.

In the configuration shown in FIG. 31, the scheme for feeding the difference signals w1, w2 back to the transfer function of the low-pass filter 96 corresponds to the "feedback means" according to the fifteenth aspect of the present invention.

Eighteenth Embodiment

Figure 32:
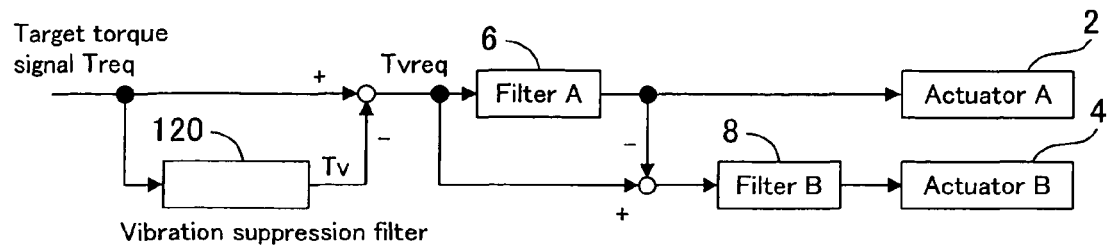
FIG. 32 is a control block diagram illustrating the torque control device according to a eighteenth embodiment of the present invention.

FIG. 32 is a control block diagram illustrating the torque control device according to an eighteenth embodiment of the present invention. The torque control device according to the present embodiment is configured so that a new function is added to the torque control device according to the first embodiment. Elements that are included in the configuration shown in FIG. 32 and identical with those of the first embodiment are assigned the same reference numerals as their counterparts.

During acceleration/deceleration, the vibration of the engine resonates with a vehicle's natural frequency, thereby causing the vehicle to vibrate in its pitching direction. Formerly, this vibration was suppressed by a method of minutely determining (optimizing) the operation value of each engine torque control actuator in relation to each vehicle driving pattern. However, this conventional method required many man-hours for optimization.

Figure 33:
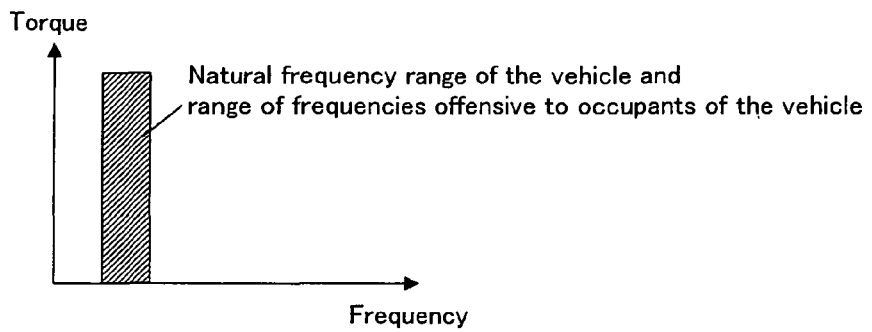
FIG. 33 shows the signal pass characteristic of the vibration suppression filter according to the eighteenth embodiment of the present invention.

The torque control device according to the present embodiment is characterized in that it can suppress the vehicle vibration without requiring many man-hours for optimization. More specifically, the structure of this torque control device is characterized in that a vibration suppression filter 120 is installed upstream of the signal distribution structure, which is composed of the filters 6, 8, as shown in FIG. 32. FIG. 33 shows the signal pass characteristic of the vibration suppression filter 120. The vibration suppression filter 120 is configured so as to allow the passage of signals within a natural frequency range of the vehicle and signals within a range of frequencies offensive to occupants of the vehicle.

Figure 34:
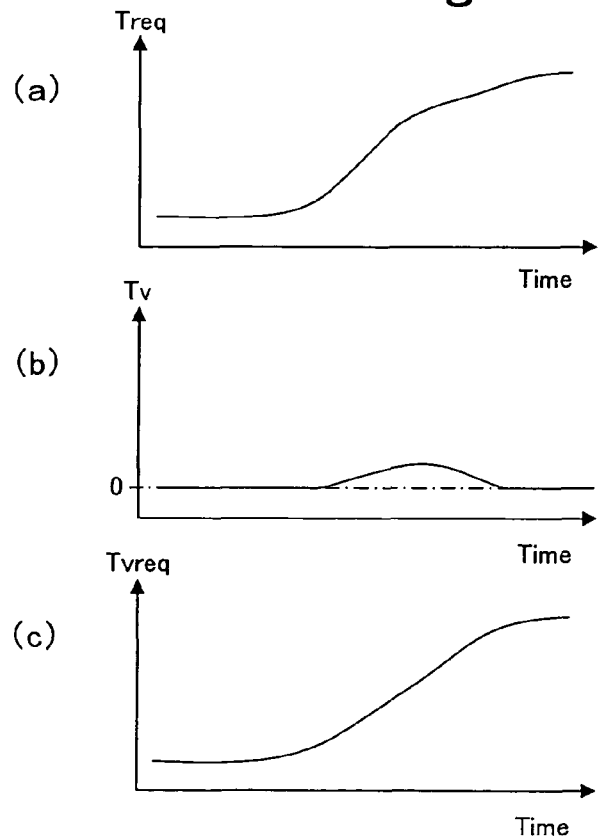
FIG. 34 shows the operation of the torque control device according to the eighteenth embodiment of the present invention.

In the configuration shown in FIG. 32, the target torque signal Treq enters the vibration suppression filter 120. The vibration suppression filter 120 has the above signal pass characteristic so that a signal Tv within a particular frequency range is extracted when the target torque signal Treq passes through the vibration suppression filter 120. The signal Tv that has passed through the vibration suppression filter 120 is eliminated from the target torque signal Treq. The resulting signal Tvreq is then distributed to the actuators 2, 4. When, for instance, the target torque signal Treq shown in FIG. 34A is input, the vibration suppression filter 120 outputs the signal Tv shown in FIG. 34B so that the signal Tvreq shown in FIG. 34C is distributed to the actuators 2, 4. The vibration suppression filter 120 corresponds to the "particular signal elimination filter" according to the twenty-sixth or twenty-seventh aspect of the present invention.

The torque control device according to the present embodiment ensures that signals within the vehicle's natural frequency range and signals within a range of frequencies offensive to the occupants of the vehicle are eliminated from the target torque signal in advance. Therefore, the vehicle vibration can be effectively suppressed without minutely determining the operation values of the actuators 2, 4 in relation to each driving pattern.

The torque control device according to the present embodiment is configured so that a new function is added to the torque control device according to the first embodiment. However, the new function added to the present embodiment can also be added to the torque control device according to any other embodiment.

Nineteenth Embodiment

Figure 35:
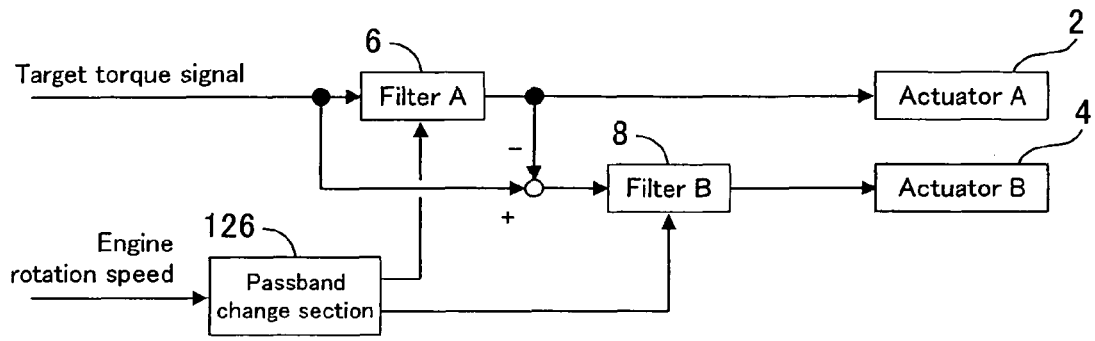
FIG. 35 is a control block diagram illustrating the torque control device according to a nineteenth embodiment of the present invention.

FIG. 35 is a control block diagram illustrating the torque control device according to a nineteenth embodiment of the present invention. The torque control device according to the present embodiment is configured so that a new function is added to the torque control device according to the first embodiment. Elements that are included in the configuration shown in FIG. 35 and identical with those of the first embodiment are assigned the same reference numerals as their counterparts.

Figure 36:
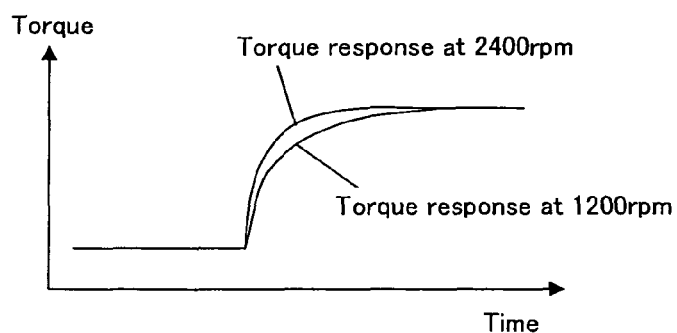
FIG. 36 shows the relationship between torque response and engine rotation speed prevailing when the throttle is opened.
Figure 37:
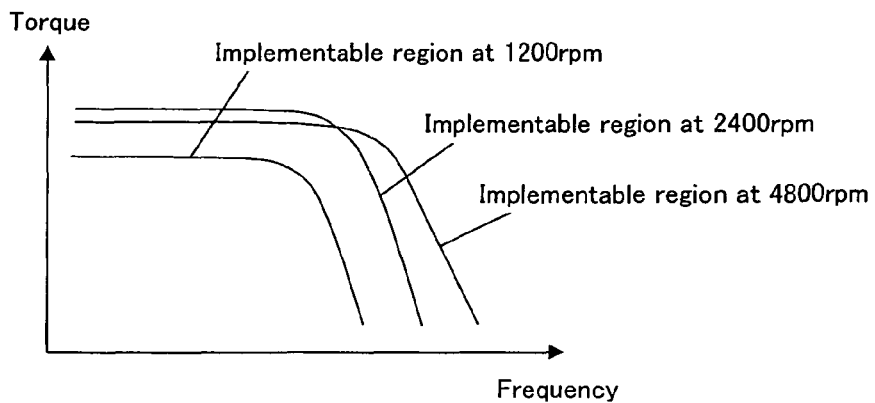
FIG. 37 shows the signal pass characteristic of a filter according to the nineteenth embodiment of the present invention.

FIG. 36 shows the relationship between torque response and engine rotation speed prevailing when the throttle is opened. As is obvious from this figure, the higher the engine rotation speed is, the higher the torque response sensitivity to a throttle operation becomes. A comparison between the throttle and ignition device, which both serve as torque control actuators, reveals that the throttle provides a relatively low frequency region available for torque control. However, when the characteristic shown in FIG. 36 is taken into consideration, a high-frequency region implementable only by the ignition device at a low rotation speed can be implemented by the throttle at a high rotation speed. FIG. 37 shows the relationship between engine rotation speeds and signal regions implementable by the throttle.

As is the case with the first embodiment, the present embodiment assumes that actuator A 2 is a throttle, and that actuator B 4 is an ignition device. Filter A 6, which allows only a signal matching the operation characteristics of actuator A 2 to pass through as a command signal, is mounted on the signal input section of actuator A 2. Further, filter B 8, which allows only a signal matching the operation characteristics of actuator B 4 to pass through as a command signal, is mounted on the signal input section of actuator B 4. The order of priority for target torque signal distribution is such that actuator A 2 precedes actuator B 4.

The configuration shown in FIG. 35 includes a passband change section 126, which changes the passbands of the filters 6, 8 in accordance with the engine rotation speed. As shown in FIG. 37, the higher the engine rotation speed is, the higher the frequency region implementable by the throttle becomes. Therefore, the passband change section 126 changes the passband of filter A 6 to a higher frequency region when the engine rotation speed increases. The same holds true for filter B 8. The passband change section 126 changes the passband of filter B 8 in accordance with the relationship between torque response sensitivity to an ignition timing retard amount (or advance amount) and engine rotation speed. The passband change section 126 corresponds to the "signal pass characteristic change means" according to the twenty-eighth aspect of the present invention.

The torque control device according to the present embodiment can make the most of the frequency region implementable by the throttle. Therefore, the number of times the ignition timing is retarded for torque control can be decreased to enhance the efficiency of the engine. Further, the frequency region implementable by the throttle during acceleration can be made best use of to provide improved torque responsiveness during acceleration.

Actuator A 2 is not limited to the throttle, and actuator B 4 is not limited to the ignition device. In the engine, in which the types of the actuators 2, 4 do not matter, the target torque signal regions implementable by the actuators 2, 4 depend on the engine rotation speed. Therefore, target torque signal distribution can be accomplished in accordance with the operating capacities of the actuators 2, 4 by changing the signal pass characteristics of the filters 6, 8 in accordance with the engine rotation speed. This makes it possible to enhance the accuracy of target torque achievement.

Further, the torque control device according to the present embodiment is configured so that a new function is added to the torque control device according to the first embodiment. However, the new function added to the present embodiment can also be added to the torque control device according to any other embodiment. When the new function added to the present embodiment is to be added to the torque control device according to the second embodiment, it is preferred that the passband of the mediation filter 18 be also changed in accordance with the engine rotation speed.

Twentieth Embodiment

Figure 38:
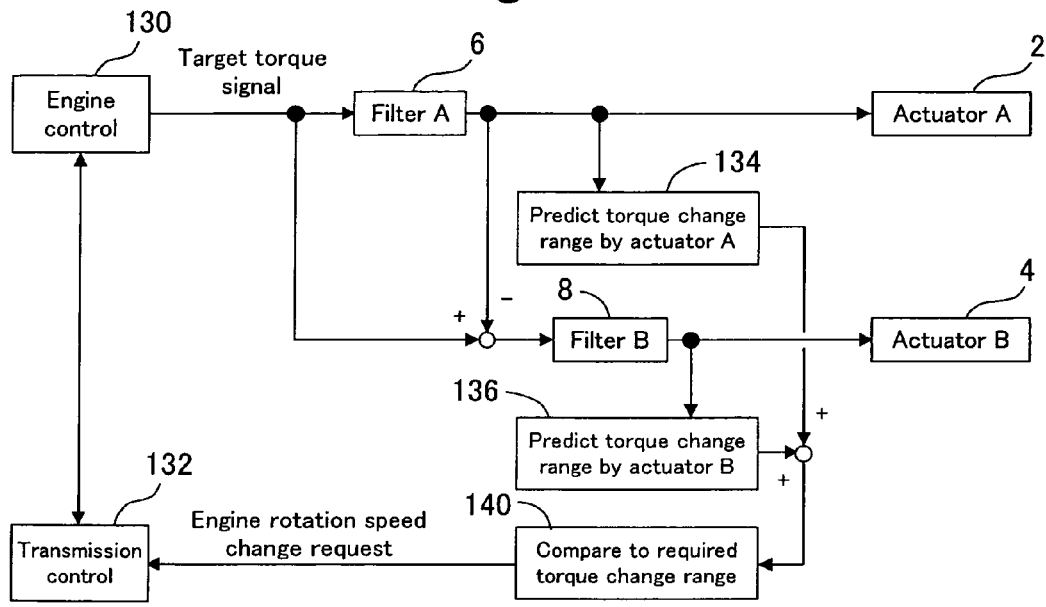
FIG. 38 is a control block diagram illustrating the torque control device according to a twentieth embodiment of the present invention.

FIG. 38 is a control block diagram illustrating the torque control device according to a twentieth embodiment of the present invention. The torque control device according to the present embodiment is configured so that a new function is added to the torque control device according to the first embodiment. Elements that are included in the configuration shown in FIG. 38 and identical with those of the first embodiment are assigned the same reference numerals as their counterparts.

Various torque requests are sent to an engine control device (this control device is at a higher level than the torque control device). The torque requests include not only a request from the driver but also requests from various devices such as a VSC, TRC, and transmission. The engine control device compiles the various torque requests into an engine target torque, converts the engine target torque into a digital target torque signal, and supplies the obtained target torque signal to the torque control device. The target torque signal is distributed to each actuator so that each actuator operates to achieve the target torque.

Figure 39:
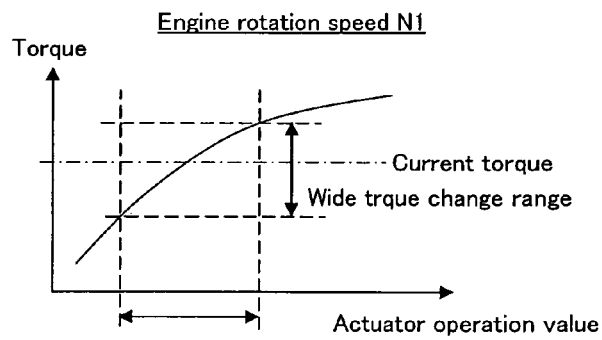
FIG. 39 shows the relationship between torque response and engine rotation speed.
Figure 40:
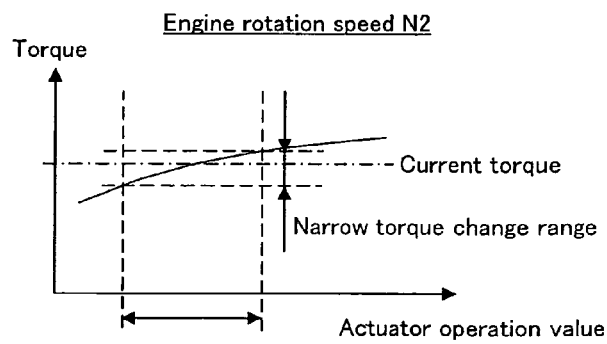
FIG. 40 shows the relationship between torque response and engine rotation speed.

In the engine, however, the torque response sensitivity to an actuator operation depends on the engine rotation speed. FIGS. 39 and 40 show the relationship between an actuator's operation value and torque. FIG. 39 shows torque changes at an engine rotation speed of N1, whereas FIG. 40 shows torque changes at an engine rotation speed of N2 (N2≠N1). As indicated in the figures, the range of torque changes with actuator operation value changes varies with the engine rotation speed. Therefore, the torque response sensitivity to an actuator operation may be low depending on the engine rotation speed. Consequently, the aforementioned torque requests may not be fulfilled.

In view of the above circumstances, the torque control device according to the present embodiment judges the torque change range required in each operation mode of the vehicle or engine. When, for instance, hazard avoidance or vibration suppression control is to be performed, high torque response needs to be provided, and the required torque change range becomes wide. Further, the torque control device according to the present embodiment predicts the range of torque changes that can be brought about by each actuator at the current engine rotation speed. If the predicted torque change range is insufficient as compared to the required torque change range, the torque change range is enlarged by exercising transmission control to change the engine rotation speed.

In the configuration shown in FIG. 38, a torque change range prediction section 134 predicts the torque change range that can be achieved by actuator A 2. The torque change range prediction section 134 searches a map using the command signal input to actuator A 2 and the engine rotation speed as search criteria, and acquires the data (torque change range) matching the search criteria from the map. Further, a torque change range prediction section 136 predicts the torque change range that can be achieved by actuator B 4. The torque change range prediction section 136 searches a map using the command signal input to actuator B 4 and the engine rotation speed as search criteria, and acquires the data (torque change range) matching the search criteria from the map.

The predicted torque change ranges achievable by actuators 2, 4 enter a torque change range insufficiency judgment section 140. The torque change range insufficiency judgment section 140 predicts the range of torque changes required in the current operation mode, that is, the range of target torque changes in the current operation mode. Further, the torque change range insufficiency judgment section 140 compares the torque change ranges achievable by the actuators 2, 4 against the predicted required torque change range. If the torque change range is insufficient, the torque change range insufficiency judgment section 140 requests a transmission control section 132 to change the engine rotation speed.

The transmission control section 132 adjusts the gear ratio of a transmission (either a non-continuously variable transmission or a continuously variable transmission) in compliance with an engine rotation speed change request and changes the engine rotation speed in the direction of enlarging the torque change range. The result of transmission control by the transmission control section 132 is reflected in an engine control section 130. The engine control section 130 recalculates the target torque on the basis of the reflected transmission control result.

In the configuration shown in FIG. 38, the torque change range prediction sections 134, 136 correspond to the "torque change range prediction means" according to the twenty-ninth aspect of the present invention; the torque change range insufficiency judgment section 140 corresponds to the "target torque change range prediction means" according to the twenty-ninth aspect of the present invention; and the transmission control section 132 corresponds to the "transmission gear ratio control means" according to the twenty-ninth aspect of the present invention.

The torque control device according to the present embodiment can control the gear ratio of a transmission to change the engine rotation speed by exercising engine control and transmission control functions in a coordinated manner. Therefore, the torque change ranges achieved by the actuators 2, 4 can be enlarged to cover the torque change range required in the current operation mode. This makes it possible to achieve a target torque with high accuracy.

The torque control device according to the present embodiment is configured so that a new function is added to the torque control device according to the first embodiment. However, the new function added to the present embodiment can also be added to the torque control device according to any other embodiment.

Other

While the present invention has been described in terms of preferred embodiments, the invention is not limited to those preferred embodiments, but extends to various modifications that nevertheless fall within the scope of the appended claims.

The present invention can be applied not only to a spark ignition engine but also to the other types of engines such as a diesel engine. Further, the present invention is applicable to a power system other than an engine, such as a hybrid system composed of an engine and a motor.

When the present invention is applied to an engine, the torque control actuators are not limited to the throttle, ignition device, fuel injection device, and variable lift mechanism. For example, an engine having a motor-assisted turbocharger (MAT) can use the MAT as a torque control actuator. Further, the torque (effective torque) of an engine can be indirectly controlled by causing an alternator and other engine-driven accessories to control the load imposed on the engine. Therefore, these accessories can also be used as torque control actuators.

The invention claimed is:

1. A torque control device for a power system, comprising:
   a target torque signal generation section which generates a target torque signal according to the power system's target torque;
   a plurality of actuators which operate in accordance with input command signals and cause the power system to achieve torque according to the operation;
   a plurality of signal processing filters which are mounted on a signal input section of each actuator and allow only a portion of supplied signal having frequencies at which the corresponding actuator is operative to pass through as a command signal for corresponding actuator;
   a signal distribution structure which distributes the target torque signal to the actuators according to a predetermined distribution priority order, the signal distribution structure supplying, for the highest-order actuator in the distribution priority order, the target torque signal to the corresponding signal processing filter and supplying, for the actuator of which the order is less than or equal to second-order in the distribution priority order, a signal obtained by subtracting a signal that has passed through the signal processing filter for the next high-order actuator from a signal that has not passed through to the corresponding signal processing filter; and
   a feedback structure which, if there is a difference between a signal that has not passed through the signal processing filter for the lowest-order actuator and a signal that has passed through, ensures that a difference signal representing the difference is reflected in the generation of a target torque signal by the target torque signal generation section.

2. The torque control device for a power system according to claim 1, wherein the lower the torque response sensitivity to the operation of an actuator is, the higher the distribution priority order of the actuator is set.

3. The torque control device for a power system according to claim 1, wherein the power system is an internal combustion engine mounted in an automobile.

4. The torque control device for a power system according to claim 3, wherein the actuators include a throttle for adjusting the intake air amount and an ignition device for adjusting the ignition timing.

5. The torque control device for a power system according to claim 4, wherein the actuators further include a fuel injection device for adjusting the fuel injection timing and the fuel injection amount.

6. The torque control device for a power system according to claim 4, wherein the actuators further include an accessory that is driven by the internal combustion engine.

7. The torque control device for a power system according to claim 3, wherein the actuators include a variable lift mechanism for changing the lift amount of an intake valve and an ignition device for adjusting the ignition timing.

8. The torque control device for a power system according to claim 3, further comprising:
   a particular signal elimination filter which eliminates a signal component within a particular frequency region from the target torque signal to be supplied to the signal distribution structure.

9. The torque control device for a power system according to claim 8, wherein the particular signal elimination filter eliminates a signal component having the same frequency as a vehicle's natural frequency from the target torque signal.

10. The torque control device for a power system according to claim 3, further comprising:
    signal pass characteristic change means which changes the signal pass characteristic of the signal processing filter in accordance with the rotation speed of the internal combustion engine.

11. The torque control device for a power system according to claim 3, the power system including a transmission that shifts gears and transmits the rotary motion of the internal combustion engine to driving wheels, the torque control device further comprising:
    torque change range prediction means which predicts the range of torque changes that can be brought about by operating each of the actuators at the current engine rotation speed;
    target torque change range prediction means which predicts the range of target torque changes under the current operating conditions; and
    transmission gear ratio control means which, when an achievable torque change range is insufficient as compared to a target torque change range, adjusts the gear ratio of the transmission to change the engine rotation speed in the direction of enlarging the torque change range.

12. The torque control device for a power system according to claim 1, wherein the power system is a hybrid power system composed of an internal combustion engine and a motor; and wherein the actuators include the motor.

* * * * *